United States Patent
Nelson

(10) Patent No.: US 9,996,222 B2
(45) Date of Patent: Jun. 12, 2018

(54) AUTOMATIC DEEP VIEW CARD STACKING

(71) Applicant: Samsung Electronics Co., Ltd., Suwon-si, Gyeonggi-do (KR)

(72) Inventor: Joseph Phillip Nelson, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/858,801

(22) Filed: Sep. 18, 2015

(65) Prior Publication Data

US 2017/0083171 A1 Mar. 23, 2017

(51) Int. Cl.
| | |
|---|---|
| *G06F 3/0482* | (2013.01) |
| *G06F 3/0484* | (2013.01) |
| *G06F 3/0488* | (2013.01) |
| *G06F 17/30* | (2006.01) |
| *G06F 3/16* | (2006.01) |

(52) U.S. Cl.
CPC ........ *G06F 3/0482* (2013.01); *G06F 3/04845* (2013.01); *G06F 3/04883* (2013.01); *G06F 17/3056* (2013.01); *G06F 17/30477* (2013.01); *G06F 17/30867* (2013.01); *G06F 3/167* (2013.01); *G06F 2203/04806* (2013.01); *G06F 2203/04808* (2013.01)

(58) Field of Classification Search
CPC ............... G06F 3/0482; G06F 3/04883; G06F 3/04806; G06F 3/04808
See application file for complete search history.

(56) References Cited

U.S. PATENT DOCUMENTS

| | | | | |
|---|---|---|---|---|
| 5,060,135 A | * | 10/1991 | Levine ................ | G06F 3/04817 715/769 |
| 7,600,192 B1 | * | 10/2009 | Hashimoto ........... | G06F 3/0482 715/716 |
| 7,694,236 B2 | * | 4/2010 | Gusmorino ......... | G06F 3/04817 715/763 |
| 8,949,250 B1 | | 2/2015 | Garg et al. | |
| 9,753,630 B1 | * | 9/2017 | Kim ....................... | G06F 3/0485 |
| 2004/0233238 A1 | * | 11/2004 | Lahdesmaki ........ | G06F 3/0482 715/810 |

(Continued)

OTHER PUBLICATIONS

International Search Report and Written Opinion in PCT/IB/2016/055586 dated Dec. 30, 2016.

*Primary Examiner* — Ryan Barrett
(74) *Attorney, Agent, or Firm* — Jefferson IP Law, LLP

(57) ABSTRACT

A method includes receiving cards at data processing hardware. Each card represents a collection of application access mechanisms, each application access mechanism having reference to a corresponding application executable on the data processing hardware and indicating a performable operation for the corresponding application. The collection of application access mechanisms has one or more similar application access mechanism attributes. The method also includes displaying a graphical user interface on a display in communication with the data processing hardware, the graphical user interface including card user selectable links. Each card user selectable link is associated with a card and a card access mechanism having a reference to the collection of application access mechanisms represented by the card. The method further includes receiving a user input through the graphical user interface.

16 Claims, 16 Drawing Sheets

(56) References Cited

U.S. PATENT DOCUMENTS

| | | | |
|---|---|---|---|
| 2005/0210410 A1* | 9/2005 | Ohwa | G06F 3/0482 |
| | | | 715/821 |
| 2008/0307303 A1* | 12/2008 | Louch | G06F 3/0481 |
| | | | 715/273 |
| 2009/0150775 A1* | 6/2009 | Miyazaki | G06F 3/041 |
| | | | 715/702 |
| 2009/0307623 A1* | 12/2009 | Agarawala | G06F 3/04815 |
| | | | 715/765 |
| 2010/0007623 A1* | 1/2010 | Kaneko | G06F 3/04883 |
| | | | 345/173 |
| 2010/0095240 A1* | 4/2010 | Shiplacoff | G06F 3/0483 |
| | | | 715/784 |
| 2010/0169823 A1* | 7/2010 | Audet | G06F 3/0481 |
| | | | 715/784 |
| 2010/0205186 A1* | 8/2010 | Kaasten | G06F 17/30115 |
| | | | 707/754 |
| 2010/0211872 A1* | 8/2010 | Rolston | G06F 3/0482 |
| | | | 715/702 |
| 2010/0228746 A1* | 9/2010 | Harada | G06F 3/04815 |
| | | | 707/752 |
| 2010/0246571 A1* | 9/2010 | Geppert | G06F 3/04817 |
| | | | 370/352 |
| 2010/0283743 A1* | 11/2010 | Coddington | G06F 3/0485 |
| | | | 345/173 |
| 2011/0016417 A1* | 1/2011 | Shiplacoff | G09G 5/14 |
| | | | 715/768 |
| 2011/0084921 A1 | 4/2011 | Kang et al. | |
| 2011/0296351 A1* | 12/2011 | Ewing, Jr. | G06F 3/0346 |
| | | | 715/841 |
| 2012/0023453 A1* | 1/2012 | Wagner | G06F 3/04886 |
| | | | 715/848 |
| 2013/0036383 A1 | 2/2013 | Yuan et al. | |
| 2013/0063373 A1 | 3/2013 | Roh et al. | |
| 2013/0067412 A1 | 3/2013 | Leonard et al. | |
| 2013/0124511 A1 | 5/2013 | Levin et al. | |
| 2013/0268553 A1 | 10/2013 | Surry et al. | |
| 2013/0307776 A1* | 11/2013 | Roziere | G06F 3/0482 |
| | | | 345/158 |
| 2014/0002387 A1* | 1/2014 | Hashiba | G06F 3/041 |
| | | | 345/173 |
| 2014/0282217 A1 | 9/2014 | Musa et al. | |
| 2014/0344765 A1* | 11/2014 | Hicks | G06F 3/04883 |
| | | | 715/863 |
| 2015/0212710 A1* | 7/2015 | Gupta | G06F 3/04842 |
| | | | 705/27.1 |
| 2015/0242076 A1* | 8/2015 | Jo | G06F 3/0483 |
| | | | 715/765 |
| 2015/0378556 A1* | 12/2015 | Ramanathan | G06F 3/04817 |
| | | | 715/765 |
| 2016/0132567 A1 | 5/2016 | Dole et al. | |
| 2016/0170606 A1 | 6/2016 | Lee et al. | |
| 2016/0378840 A1 | 12/2016 | Nelson et al. | |
| 2016/0378871 A1 | 12/2016 | Nelson et al. | |
| 2017/0083180 A1 | 3/2017 | Nelson | |

\* cited by examiner

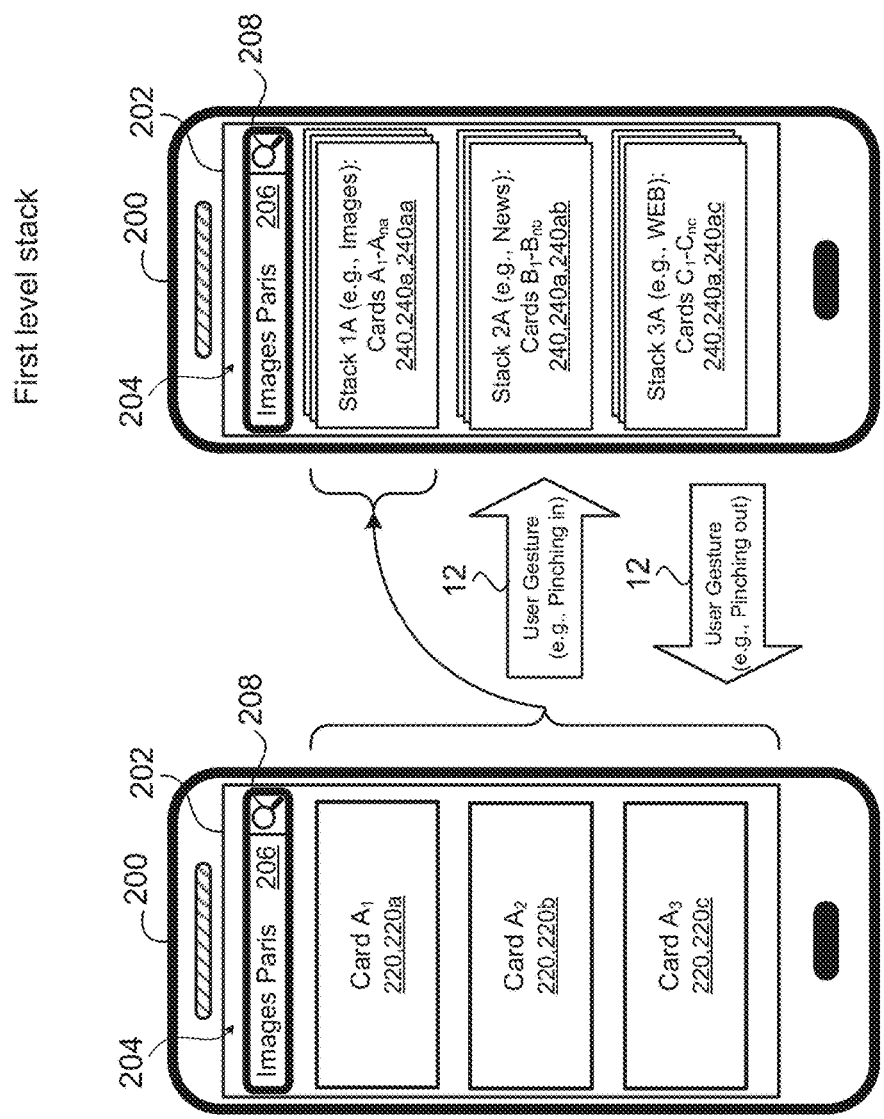

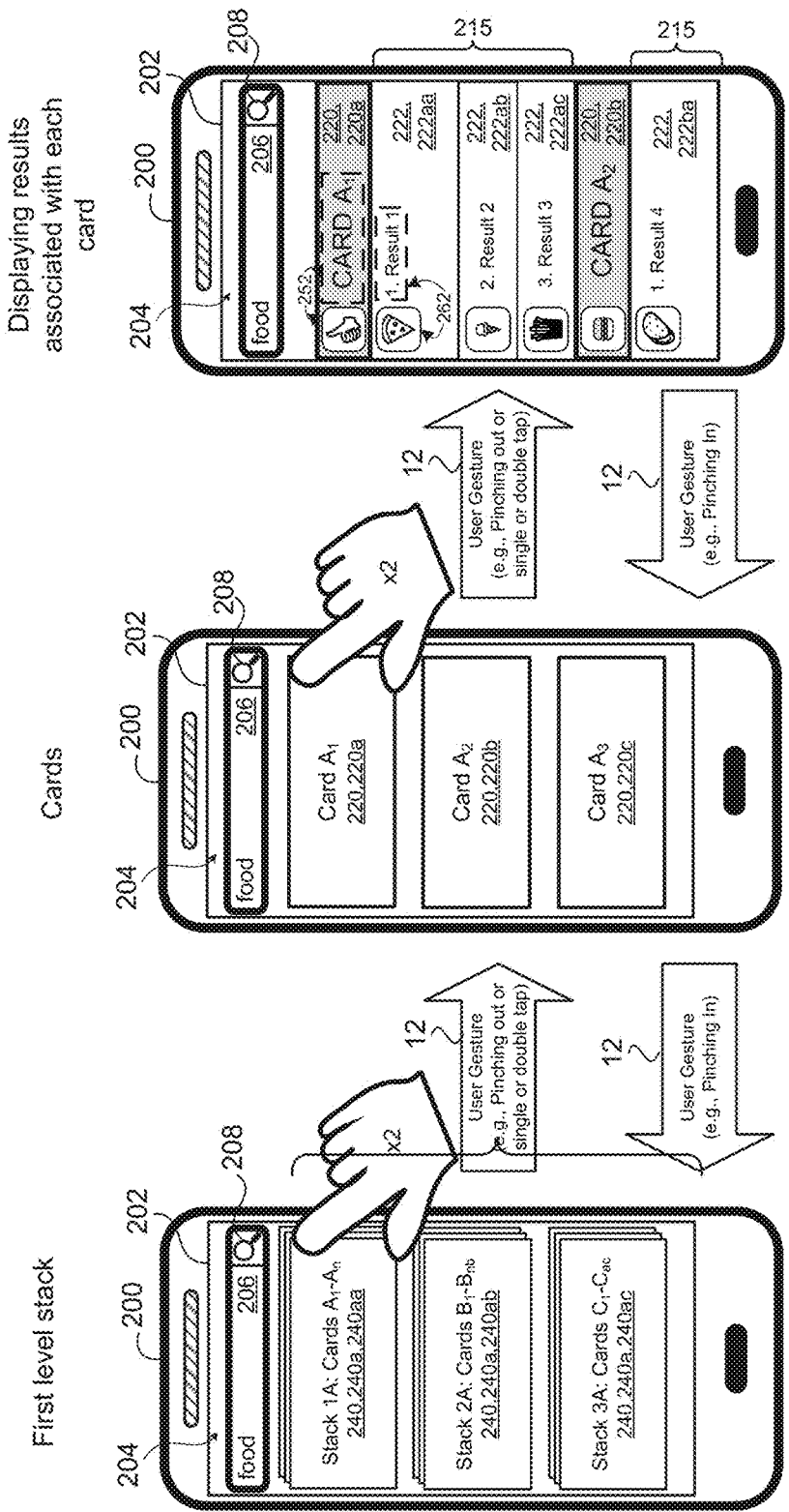

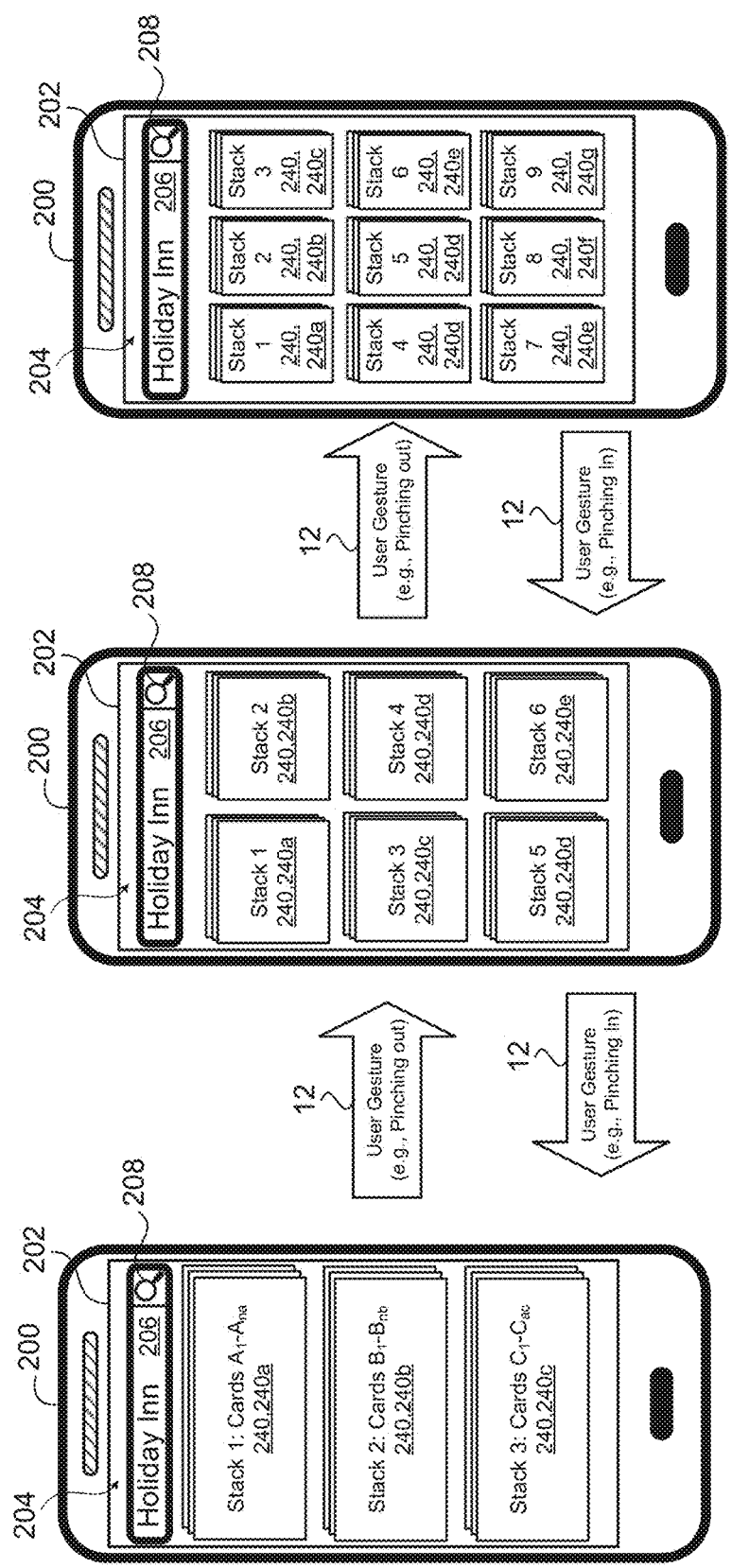

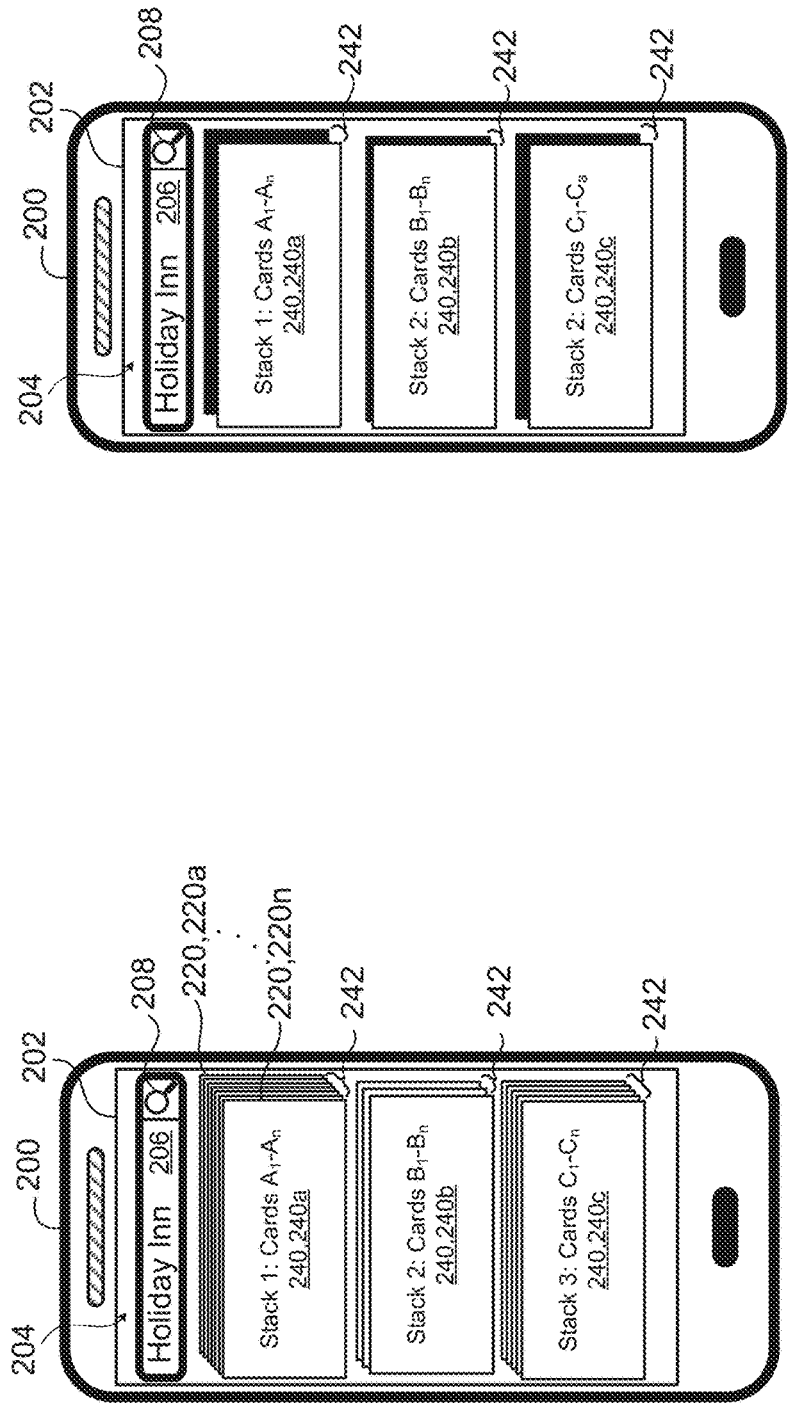

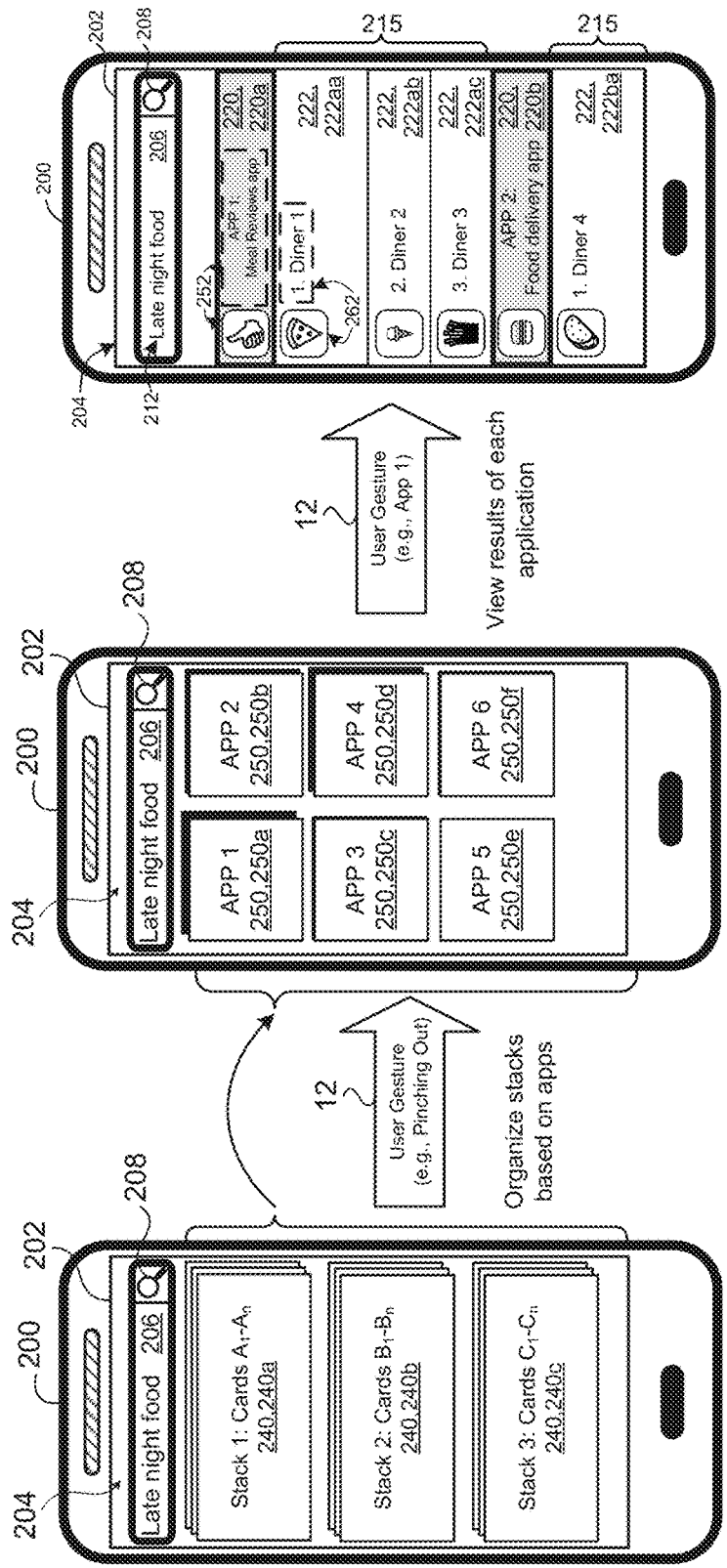

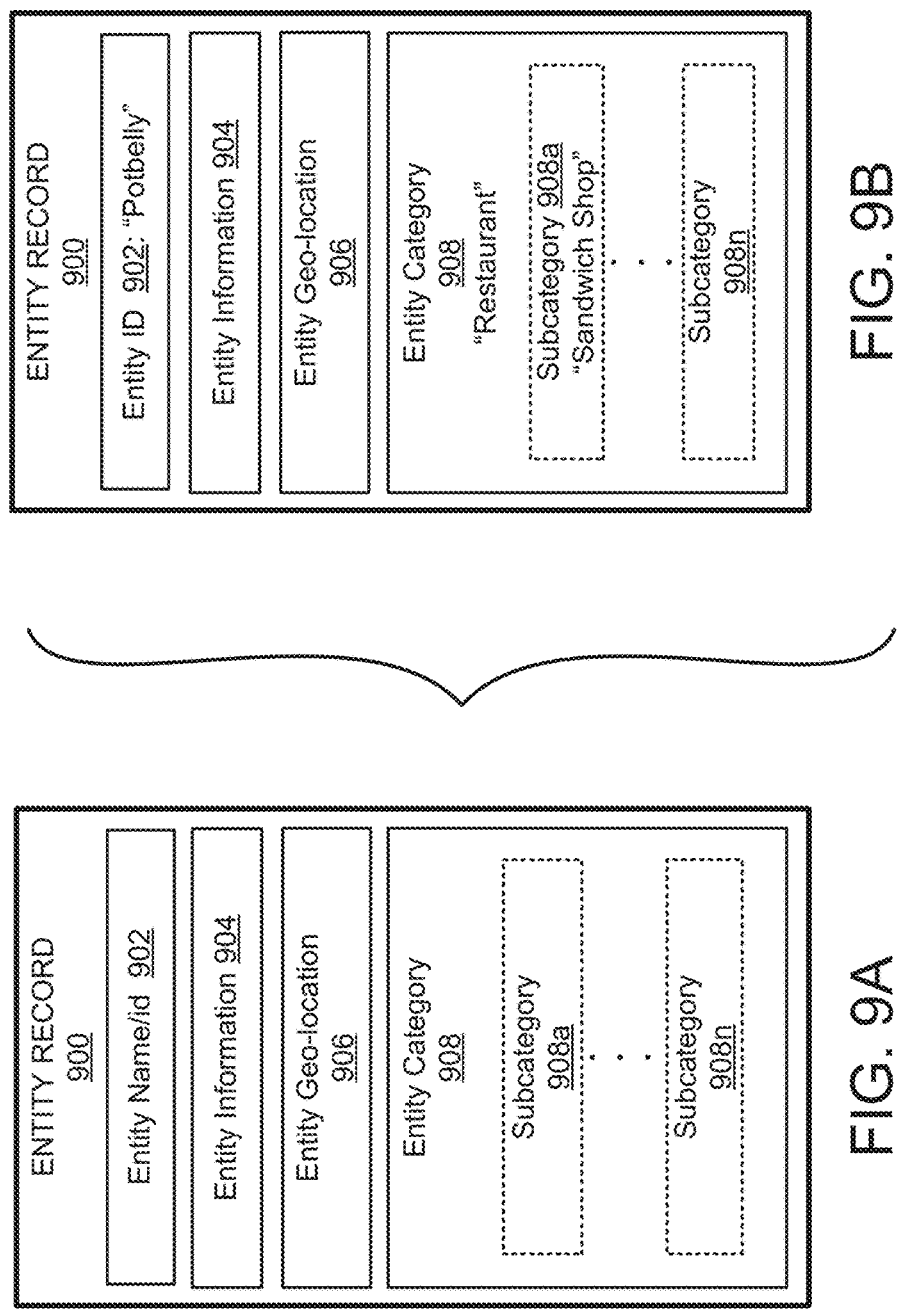

AUTOMATIC DEEP VIEW CARD STACKING

TECHNICAL FIELD

This disclosure relates to a system for automatically grouping and stacking deep view cards.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

SUMMARY

One aspect of the disclosure provides a method for recommending applications. The method includes receiving cards at data processing hardware. Each card represents a collection of application access mechanisms (e.g., search results). Each application access mechanism has a reference to a corresponding application executable on the data processing hardware and indicating a performable operation for the corresponding application. The collection of application access mechanisms has one or more similar application access mechanism attributes. The method also includes displaying a graphical user interface on a display in communication with the data processing hardware. The graphical user interface includes card user selectable links. Each card user selectable link is associated with a card and a card access mechanism having a reference to the collection of application access mechanisms represented by the card. The method further includes receiving a user input through the graphical user interface. When the user input commands a first-level grouping operation for grouping one or more cards, the method includes grouping, by the data processing hardware, the cards into one or more first-level stacks and displaying on the graphical user interface, the one or more first-level stacks. Each first-level stack includes one or more cards having one or more similar card attributes. The method further includes displaying, when the user input commands a selection of one of the card user selectable links, displaying, on the graphical user interface, application user selectable links. Each application user selectable link is associated with an application access mechanism of the collection of application assess mechanisms associated with the selected card.

Implementations of the disclosure may include one or more of the following optional features. In some implementations, the method includes receiving, at the data processing hardware, a search query through the graphical user interface and determining, by the data processing hardware, one or more result sets based on the search query. Each result set includes a collection of application access mechanisms.

The user input may include at least one of a voice command, a touch gesture, or a click selection. The touch gesture may include receiving one or more user touch interactions with the graphical user interface. The touch gesture may include at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display when the two finger swipes substantially converge at a common point.

In some examples, after displaying the one or more first-level stacks, the method includes receiving a subsequent user input through the user interface. The subsequent user input may command a second-level grouping operation for grouping one or more first-level stacks. The method may further include grouping, by the data processing hardware, the first-level stacks into one or more second-level stacks. Each second-level stack includes one or more first-level stack having one or more similar first-level stack attributes. The method may further include displaying, on the graphical user interface, the one or more second-level stacks.

When the user input commands a zooming operation and when the graphical user interface displays one or more cards, the method may include determining, by the data processing hardware, a first number of displayed cards and displaying, on the graphical user interface, a second number of cards not equal to the first number of cards. When the graphical user interface displays the one or more first-level stacks, the method may include determining, by the data processing hardware, a first number of displayed first-level stacks and displaying, on the graphical user interface, a second number of first-level stacks not equal to the first number of first-level stacks.

The method may further include receiving, at the data processing hardware, a selection of an application user selectable link and executing, by the data processing hardware, an application referenced by the application user selectable link. The application access mechanism attributes and the card attributes may include at least one of an application identifier, an application state action, an application category, an entity name, an entity location, or a type including web, image, video, and/or news. Each corresponding application may be stored on memory hardware in communication with the data processing hardware.

Another aspect of the disclosure provides a second method for recommending applications. The method includes receiving cards at data processing hardware. Each card represents a collection of application access mechanisms (e.g., search results). Each application access mechanism has a reference to a corresponding application executable on the data processing hardware and indicates a performable operation for the corresponding application. The collection of application access mechanisms has one or more similar application access mechanism attributes. The method further includes grouping, by the data processing hardware, the cards into one or more first-level stacks. Each first-level stack includes one or more cards having one or more similar card attributes. The method also includes displaying a graphical user interface on a display in communication with the data processing hardware. The graphical user interface includes the one or more first-level stacks. The method further includes receiving a user input through the graphical user interface. When the user input commands a first-level ungrouping operation for the one or more first-level stacks, the method includes ungrouping, by the data processing hardware, the first-level stacks into the one or more cards associated with the selected first-level stack, and displaying, on the graphical user interface, the one or more cards associated with the selected first-level stack. When the user input commands a second-level grouping operation for the one or more first-level stacks, the method includes grouping, by the data processing hardware, the first-level stacks into one or more second-level stacks and displaying, on the graphical user interface, the one or more second-level stacks. Each second-level stack includes one or more first-level stacks having one or more similar first-level stack attributes.

This aspect may include one or more of the following optional features. In some examples, the method includes after displaying the one or more cards associated with the selected first-level stack, receiving a subsequent user input through the graphical user interface. The subsequent user input commands a selection of card user selectable links associated with a card and a card access mechanism having a reference to the collection of application access mechanisms represented by the card. The method may further include displaying, on the graphical user interface, application user selectable links. Each application user selectable link may be associated with an application access mechanism of the collection of application assess mechanisms associated with the selected card.

In some implementations, the method includes receiving, at the data processing hardware, a selection of an application user selectable link and executing, by the data processing hardware, an application referenced by the application user selectable link. The method may also include receiving, at the data processing hardware, a search query through the graphical user interface and determining, by the data processing hardware, one or more result sets based on the search query. Each result set includes a collection of application access mechanisms.

The user input includes at least one of a voice command, a touch gesture, or a click selection. The touch gesture may include receiving one or more user interactions with the graphical user interface. The touch gesture may include at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display when the two finger swipes substantially converge at a common point.

When the graphical user interface displays one or more cards, the method may include determining, by the data processing hardware, a first number of displayed cards, and displaying, on the graphical user interface, a second number of cards not equaling the first number of cards. When the graphical user interface displays the one or more first-level stacks, the method may include determining, by the data processing hardware, a first number of displayed first-level stacks, and displaying, on the graphical user interface, a second number of first-level stacks not equaling the first number of first-level stacks. When the graphical user interface displays the one or more second-level stacks, the method includes determining, by the data processing hardware, a first number of displayed second-level stacks, and displaying, on the graphical user interface, a second number of second-level stacks not equaling the first number of second-level stacks.

In some examples, the application access mechanism attributes, the card attributes, and the first-level stack attributes include at least one of an application identifier, an application state action, an application category, an entity name, an entity location, or type including web, image, video, or news. Each corresponding application may be stored on memory hardware in communication with the data processing hardware.

Yet another aspect of the disclosure provides a user device for recommending applications. The user device includes a display, a data processing hardware in communication with the display, and memory hardware in communication with the data processing hardware. The memory hardware stores instructions that when executed on the data processing hardware cause the data processing hardware to perform operations. The operations include receiving cards, each card representing a collection of application access mechanisms (e.g., search results). Each application access mechanism has a reference to a corresponding application executable on the data processing hardware and indicates a performable operation for the corresponding application. The collection of application access mechanisms has one or more similar application access mechanism attributes. The operations further include displaying a graphical user interface on the display. The graphical user interface includes card user selectable links, and each card user selectable link is associated with a card and a card access mechanism having a reference to the collection of application access mechanisms represented by the card. The operations further include receiving a user input through the graphical user interface. When the user input commands a first-level grouping operation for grouping one or more cards, the operations include grouping, by the data processing hardware, the cards into one or more first-level stacks and displaying, on the graphical user interface, the one or more first-level stacks. Each first-level stack includes one or more cards having one or more similar card attributes. When the user input commands a selection of one of the card user selectable links, the operations include displaying, on the graphical user interface, application user selectable links. Each application user selectable link is associated with an application access mechanism of the collection of application assess mechanisms associated with the selected card.

This aspect may include one or more of the following optional features. In some examples, the operations further include receiving a search query through the graphical user interface and determining one or more result sets based on the search query. Each result set includes a collection of application access mechanisms.

The user input may include at least one of a voice command, a touch gesture, or a click selection. The touch gesture may include receiving one or more user touch interactions with the graphical user interface. In some examples, the touch gesture includes at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display when the two finger swipes substantially converge at a common point.

In some implementations, the operations further include, after displaying the one or more first-level stacks, receiving a subsequent user input through the user interface. The subsequent user input commands a second-level grouping operation for grouping one or more first-level stacks. The operations may further include grouping the first-level stacks into one or more second-level stacks and displaying, on the graphical user interface, the one or more second-level stacks. Each second-level stack includes one or more first-level stack having one or more similar first-level stack attributes. When the user input commands a zooming operation, the operations may further include, when the graphical user interface displays one or more cards, determining a first number of displayed cards, and displaying, on the graphical user interface, a second number of cards not equal to the first number of cards. When the graphical user interface displays the one or more first-level stacks, the operations may further include determining a first number of displayed first-level stacks, and displaying, on the graphical user interface, a second number of first-level stacks not equal to the first number of first-level stacks. The operations may further include receiving a selection of an application user selectable and executing an application referenced by the application user selectable link.

The application access mechanism attributes and the card attributes may include at least one of an application identifier, an application state action, an application category, an entity name, an entity location, or a type including web, image, video, and/or news. Each corresponding application may be stored on memory hardware in communication with the data processing hardware.

Yet another aspect of the disclosure provides a user device for recommending applications. The user device includes a display, data processing hardware in communication with the display, and memory hardware in communication with the data processing hardware. The memory hardware stores instructions that when executed on the data processing hardware cause the data processing hardware to perform operations. The operations include receiving cards at the data processing hardware. Each card represents a collection of application access mechanisms. Each application access mechanism has a reference to a corresponding application executable on the data processing hardware and indicates a performable operation for the corresponding application. The collection of application access mechanisms has one or more similar application access mechanism attributes. The operations further include grouping, by the data processing hardware, the cards into one or more first-level stacks and displaying a graphical user interface on the display. The graphical user interface includes the one or more first-level stacks. Each first-level stack includes one or more cards having one or more similar card attributes. The operations further include receiving a user input through the graphical user interface. When the user input commands a first-level ungrouping operation for the one or more first-level stacks, the operations include ungrouping, by the data processing hardware, the first-level stacks into the one or more cards associated with the selected first-level stack and displaying, on the graphical user interface, the one or more cards associated with the selected first-level stack. When the user input commands a second-level grouping operation for the one or more first-level stacks, the operations include grouping, by the data processing hardware, the first-level stacks into one or more second-level stacks and displaying, on the graphical user interface, the one or more second-level stacks. Each second-level stack includes one or more first-level stacks having one or more similar first-level stack attributes.

This aspect may include one or more of the following optional features. The operations may further include, after displaying the one or more cards associated with the selected first-level stack, receiving a subsequent user input through the graphical user interface that commands a selection of card user selectable link associated with a card and a card access mechanism having a reference to the collection of application access mechanisms represented by the card. The operations may further include displaying, on the graphical user interface, application user selectable links. Each application user selectable link may be associated with an application access mechanism of the collection of application assess mechanisms associated with the selected card.

In some examples, the operations further include receiving a selection of an application user selectable link, and executing an application referenced by the application user selectable link. The operations may further include receiving a search query through the graphical user interface, and determining, by the data processing hardware, one or more result sets based on the search query, each result set including a collection of application access mechanisms.

The user input may include at least one of a voice command, a touch gesture, or a click selection. The touch gesture may include receiving one or more user interactions with the graphical user interface. The touch gesture may further include at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display when the two finger swipes substantially converge at a common point.

The operations may also include receiving a zooming user gesture. When the graphical user interface displays one or more cards, the operations may include determining, by the data processing hardware, a first number of displayed cards and displaying, on the graphical user interface, a second number of cards not equaling the first number of cards. When the graphical user interface displays the one or more first-level stacks, the operations may include determining, by the data processing hardware, a first number of displayed first-level stacks and displaying, on the graphical user interface, a second number of first-level stacks not equaling the first number of first-level stacks. When the graphical user interface displays the one or more second-level stacks, the operations may include determining, by the data processing hardware, a first number of displayed second-level stacks and displaying, on the graphical user interface, a second number of second-level stacks not equaling the first number of second-level stacks.

The application access mechanism attributes, the card attributes, and the first-level stack attributes may include at least one of: an application identifier, an application state action, an application category, an entity name, an entity location, or type including web, image, video, or news. Each corresponding application may be stored on memory hardware in communication with the data processing hardware.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3F are schematic views of example user devices displaying cards and stacked cards.

FIGS. 4A-4D are schematic views of example user devices displaying cards and stacked cards.

FIGS. 5A-5C are schematic views of example user devices displaying card stacks.

FIGS. 6A and 6B are schematic views of an example user device displaying stacked cards having a depth.

FIGS. 7A-7C are schematic views of example user devices displaying card stacks organized by applications.

FIGS. 9A and 9B are schematic views of example entity records.

Like reference symbols in the various drawings indicate like elements.

DETAILED DESCRIPTION

The present disclosure describes a system and method for managing view-ability of content on a user device. In many instances, a display area of a user device is small, so it is desirable to have a system that allows a user to manage an amount content displayed on the user device. For example, the user may wish to view a high level of content or a low level of content. In the case of deep view cards for applications, the system allows the user to view more or less cards by grouping the cards into stacks (first-level stacks) and grouping stacks into additional stacks (second-level stacks), and so on. Each card may represent a collection of similar search results from an application executable on or associated with the user device. The user can group and ungroup cards into stacks and stacks into additional stacks through one or more interactions (e.g., touch gestures) with a user interface on the user device to cause the grouping and ungrouping of cards and stacks. A grouping system executing on the user device or a remote system in communication with the user devices manages and implements the grouping and ungrouping of cards and stacks, for example, by identifying which cards and stacks have similar attributes.

Figure 1:
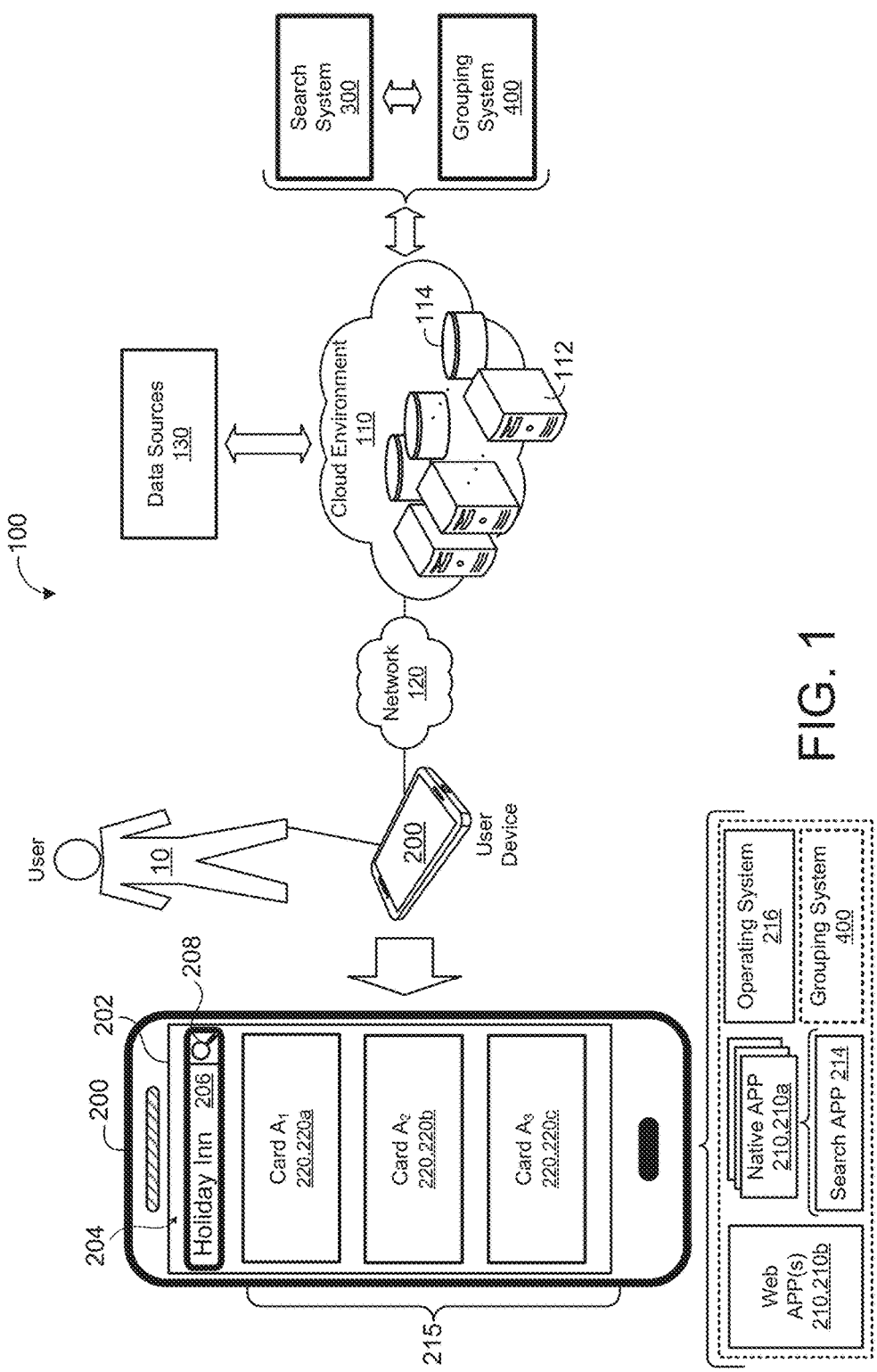
FIG. 1 is a schematic view of an example environment including a user device in communication with a grouping system.
Figure 2:
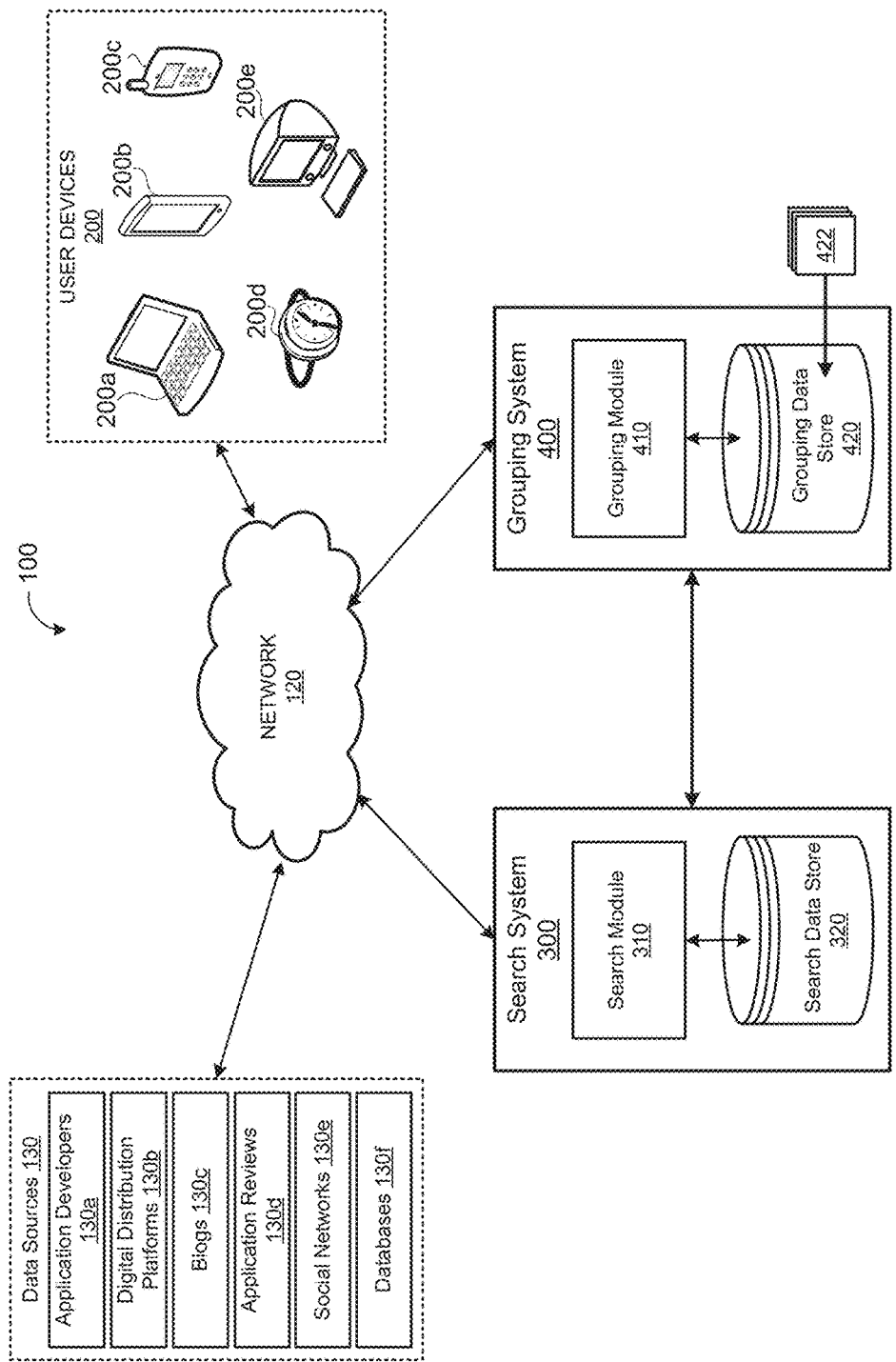
FIG. 2 is a functional block diagram of an example system having a grouping system that interacts with the user device and data sources.

Referring to FIGS. 1 and 2, in some implementations, a system 100 includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 may implement a grouping system 400 that optionally receives data from one or more data sources 130 or one or more other user devices 200. In some implementations, the grouping system 400 communicates with the one or more user devices 200, and the data sources(s) via the network 120. The network 120 may include various types of networks, such as a local area network (LAN), wide area network (WAN), and/or the Internet. As shown, in some implementations, the grouping system 400 is separate from the user device 200; while in other implementations, the grouping system 400 executes on the user device 200, as will be discussed with reference to FIG. 10.

The data sources 130 may include a variety of different data providers. The data sources 130 may include data from application developers 130a, such as application developers websites and data feeds provided by developers. The data sources 130 may include operators of digital distribution platforms 130b configured to distribute native applications 210a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications 210. Additionally, the data sources 130 may include social networking sites 130e, such as "FACEBOOK®" by Facebook, Inc. Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

A software application 210 may refer to computer software that, when executed by a computing device, causes the computing device to perform a task. In some examples, a software application 210 is referred to as an "application", an "app", or a "program". Example software applications 210 include, but are not limited to, word processing applications, spreadsheet applications, messaging applications, media streaming applications, social networking applications, and games.

Figures 3A, 3B, 3C:
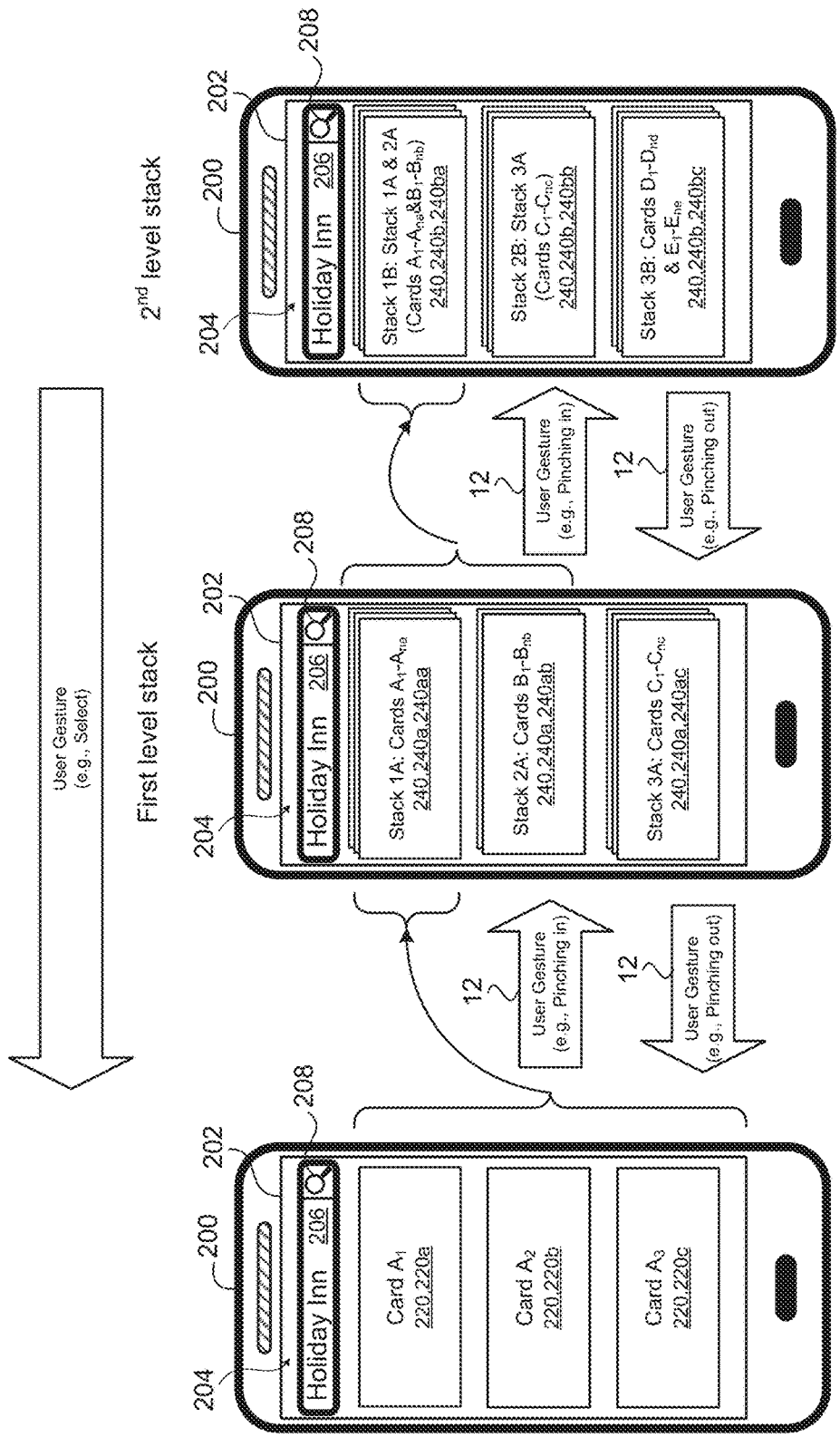

The user device 200 may be any computing device capable of displaying on a screen 202 by way of a graphical user interface (GUI) 204, one or more cards 220 associated with one or more applications 210 installed on the user device 200, and one or more stacks 240 (as shown in FIGS. 3B and 3C). In addition, the computing device 200 is capable of executing the one or more installed applications 210. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 216. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 216 running on the user device 200 may include, but is not limited to, one of ANDROID®, IOS®, or WINDOWS PHONE®. In an example where a user device 200 is a laptop or desktop computing device, the user device 200 may run an operating system including, but not limited to, MICROSOFT WINDOWS® by Microsoft Corporation, MAC OS® by Apple, Inc., or Linux. User devices 200 may also access the search system 300 or the grouping system 400 while running operating systems 216 other than those operating systems 216 described above, whether presently available or developed in the future.

Applications 210 may be executed on a variety of different user devices 200. In some examples, a native application 210a is installed on a user device 200 prior to a user 10 purchasing the user device 200. In other examples, the user 10 may download and install native applications 210a on the user device 200.

The functionality of an application 210 may be accessed on the computing device 200 on which the application 210 is installed. Additionally or alternatively, the functionality of an application 210 may be accessed via a remote computing device 112. In some examples, all of an application's functionality is included on the computing device 112, 200 on which the application 210 is installed. These applications 210 may function without communication with other computing devices 112, 200 (e.g., via the Internet). In other examples, an application 210 installed on a computing device 200 may access information from other remote computing devices 112 during operation. For example, a weather application installed on a computing device 200 may access the latest weather information via the Internet and display the accessed weather information to the user 10 through the installed weather application. In stilt other examples, a web-based application 210b (also referred to herein as a web application) may be partially executed by the user's computing device 200 and partially executed by a remote computing device 112. For example, a web application 210b may be an application 210 that is executed, at least in part, by a web server and accessed by a web browser (e.g., a native application 210a) of the user's computing device 200. Example web applications 210b may include, but are not limited to, web-based email, online auctions, and online retail sites.

The user device 200 may have limited display area on the screen 202 to display icons or search results 215 after the search system 300 executes a search and retrieves results from a search data store 320. Therefore, it is desirable to organize the search results 215 by grouping them into one or more cards 220 and/or one or more card stacks 240, where each card 220 represents a collection of similar search results 215 from an application associated 210a with the user device 200 and each card stack 240 is a collection of cards 220. After the search system 300 executes a search, the user 10 is provided with (by way of the user device displaying 202) search results 215 organized/grouped into one or more cards 220 or one or more card stacks 240. The grouping system 400 organizes/groups the cards 220 and/or card stacks 240 based on one or more similar parameters associated with each search result 215. In addition, the grouping system 400 allows the user 10 to view the search results 215 individually, as cards 220, or as card stacks 240 (having multiple card stack levels). The user 10 interacts with the GUI 204 displayed on the screen 202 to switch views between the search results 215, the cards 220, or the multiple level card stacks 240. Based on the interaction or user input (e.g., user gesture with the screen 202), the grouping system 400 identifies a command associated with the user input and executes the command. In response to the command, the grouping system 400 groups the search results 215 into cards 220, the cards into card stacks 240, first-level card stacks 240 into second-level card stacks 240, or second-level card stacks 240 into third-level card stacks 240, and so on. Also in response to the command, the grouping system 400 may expand the third-level card stack 240 into a second-level card stack 240, a second-level card stack 240 into one or more cards 220, or a card 240 into search results 215. Therefore, the grouping system 400 determines the command associated with the user input based on a current display of the GUI 204.

In general, the user device 200 may communicate with the grouping system 400 using any software application 210, such as a search application 214 and provide grouping/expanding of the search results 215 to the user 10. The grouping system 400 is discussed as executing after the search system 300 executed the search. However, the grouping system 400 may execute at any time, and the user 10 is provided with a list of access mechanisms 212 associated with an application 210a installed on the user device 200.

In some examples, the user device 200 executes the search application 214 or any other application 210 that interfaces with the grouping system 400 (executing on the user device 200 or remotely). The user device 200 may communicate with the grouping system 400 using a more general application 210, such as a web-browser application 210 accessed using a web browser native application 210a. Although the user device 200 may communicate with the grouping system 400 using the search application 214 and/or a web-browser application 210b, the user device 200 may be described hereinafter as using the search application 214 to communicate with the grouping system 400. In some implementations, the functionality attributed to the grouping system 400 is included as a grouping/expanding component of a larger application 210 that has additional functionality. For example, the functionality attributed to the grouping system 400 may be included as part of a native application 210a or a web application 210b as a feature that provides grouping of items displayed by way of the GUI 204 on the user screen 202.

In some implementations, as shown in FIG. 2, the grouping system 400 includes a grouping module 410 in communication with a grouping data store 420. In some implementations, the search system 300 executes a search based on a search query 206 received from the user device 200. The search system 300 executes a search, resulting in search results 215 (e.g., when the user 10 selects a search button 208). The grouping system 400 receives the search results 215 from the search system 300 and determines parameters associated with each search result 215. Based on the determined parameters, the grouping module 410 groups the search results 215 into cards 220, first-level stacks 240a, second-level stacks 240b, and so on. In some examples, the grouping data store 420 stores grouping rules or attributes 422. The grouping rules 422 determine how to group the search results 215 into cards 220, how to group the cards 220 into first-level stacks 240, how to group the first-level stacks 240 into second-level stacks 240b, and so on.

Referring to FIGS. 2-3D, the grouping module 410 receives the search results 215 and analyzes the search results 215 to determine how to group the search results 215. Referring to the example shown in FIG. 3A, the grouping module 410 receives the search results 215 associated with HOLIDAY INN, the search query 206 and groups the search results 215 into one or more cards 220. In the example shown, a first Card $A_1$ 220a, a second Card $A_2$ 220b, and a third Card $A_3$ 220c are displayed on the screen 202; however, if the user 10 scrolls down the screen 202, more cards 220d-n (not shown) may be available. As previously described, each card 220 represents a collection of similar search results 215, where each search result 215 is associated with an application installed on the user device 200. The user device 200 may receive a user input, such as but not limited to, a pinching gesture, a raised pinch gesture, a swipe gesture, a voice command, a pressure pinch gesture, a pressure swipe, a pressure touch, or any other method that allows a user 10 to interact with the GUI 204 to convey an input to the grouping system 400. The grouping module 410 receives the user input 12 and determines, based on a current state of the display (e.g., card display), the grouping or expanding to execute. As shown, the screen 202 displays the cards 220; therefore, a user input (e.g., a pinching in gesture) groups the cards 240 into first-level stacks 240a. In some examples, as will be described with respect to FIG. 4C, a pinching out gesture expands the cards 220 to show the search results 215 associated with each card 220. Once the grouping module 410 determines the grouping of the cards 220 based on grouping rules 422 stored in the grouping data store 420, the user device 200 displays the grouped cards 220 as first-level stacks 240, 240a as shown in FIG. 3B. The first first-level stack 240aa (Stack 1A) groups cards $A_1$-$A_{na}$, the second first-level stack 240ab (Stack 2A) groups cards $B_1$-$B_{nb}$, and the third first-level stack 240a (Stack 3A) groups cards $C_1$-$C_{nc}$. Other first-level stacks 240a may also be available if the user 10 scrolls through the screen 202. Cards $A_1$-$A_n$ are cards 220 having one or more similar parameters that the grouping module 410 determined to be similar. Thus, Cards $A_1$-$A_n$ are not cards 220 displayed in any order in FIG. 3A. In some examples, the user 10 wants to see more cards 220 in each first-level stack 240a, therefore, the user 10 inputs another user input 12, which triggers the grouping module 410 to group the first-level stacks 240a into second-level stacks 240b as shown in FIG. 3C. FIG. 3C shows the second-level stacks 240b. As shown, a first second-level stack 240ba (Stack 1B) includes the first first-level stack 240aa (Stack 1A) and the second first-level stack 240ab (Stack 2A); which includes the cards 220 associated with both stacks 240aa, 240ab. A second second-level stack 240bb (Stack 2B) includes the third first-level stack 240ac (Stack 3A). In this case, the groping module 410 did not find another one or more first-level stacks 240a to group it with the third first-level stack 240ac (Stack 3A) in the second second-level stack 240bb (Stack 2B). A third second-level stack 240bc (Stack 3B) includes first-level stacks 240a that were not previously displayed in FIG. 3B that are currently grouped in the third second-level stack 240bc (Stack 3B). Other groupings of the second-level stacks 240b may also be available.

With continued reference to FIGS. 3A-3C, in some implementations, the user 10 enters an opposite action (e.g., a pinching out gesture) to the one described above that transitions the screen 202 from FIG. 3C to FIG. 3B to FIG. 3A. Therefore, the user 10 may fluidly change how the cards 220 are displayed and grouped or ungrouped based on the interaction of the user 10 with the screen 202.

Referring to FIG. 3B, if the user 10 selects the second first-level stack 240ab (Stack 2A), the screen 202 may display all the cards 220 originally displayed in FIG. 3A, where the cards 220 are organized in order based on their stack 240, with the screen 202 showing the first card 220 included in the second first-level stack 240ab (i.e., Card $B_1$). In this case, the user 10 may scroll upwards the screen 202 to view the cards 220 of the first first-level stack 240aa, or down until after the last card 220 of the second first-level stack 240ab (i.e., Card $B_n$) to view the cards 220 of the third (or fourth or fifth or . . . ) first-level stack 240a, 240ac. In another example, if the user TO selects the second first-level stack 240ab (Stack 2A), the screen 202 may display only display cards 220 associated with the second first-level stack 240ab (Stack 2A). In this case, if the user 10 wants to view cards 220 of another first-level stack 240a, then the user 10 needs to input a user gesture 12 to return to the view of FIG. 3B before selecting another first-level stack 240a to view the cards 220 associated with it.

Referring to FIG. 3C, if the user 10 selects the first second-level stack 240ba (Stack 1B), the screen 202 may display all the cards 220 associated with the selected first second-level stack 240ba (Stack 1B) similar to the cards shown in FIG. 3A. However, in other examples, the screen 202 displays the first-level stacks 240a as shown in FIG. 3B.

In some implementations, a user input 12 at the display of FIG. 3B or FIG. 3C may not revert back to the cards 220 as they are displayed in FIG. 3A. In other words, the cards 220 may be rearranged when the grouping module 410 ungroups expands the first level stacks 240a and/or the second-level stacks 240b to display the cards 220. In addition, in some examples, the first level stack 240a may only include one card 220.

Referring to FIGS. 3D and 3E, in some examples, the user 10 may indicate a category of search within the search query 206. The search category may include, but is not limited to, web category, image category, shopping category, video category, news category, application category, maps category. As shown, the user 10 enters "Image Paris" as the search query 206. The search system 300 executes a search, and sends the search results 215 to the grouping system 400, which organizes the search results 215 and displays them as cards 220 as shown in FIG. 3D. In response to a user gesture 12, the grouping system 400 may group the cards 220 based on categories. As shown in FIG. 3E, each first-level stack 240a is associated with a category, where the first first-level stack 240aa is associated with the category images that the user 10 searched for. In some examples, the grouping system 400 groups the cards 220 based on category, even if the user 10 fails to indicate a category in his/her search query 206.

Figure 3F:
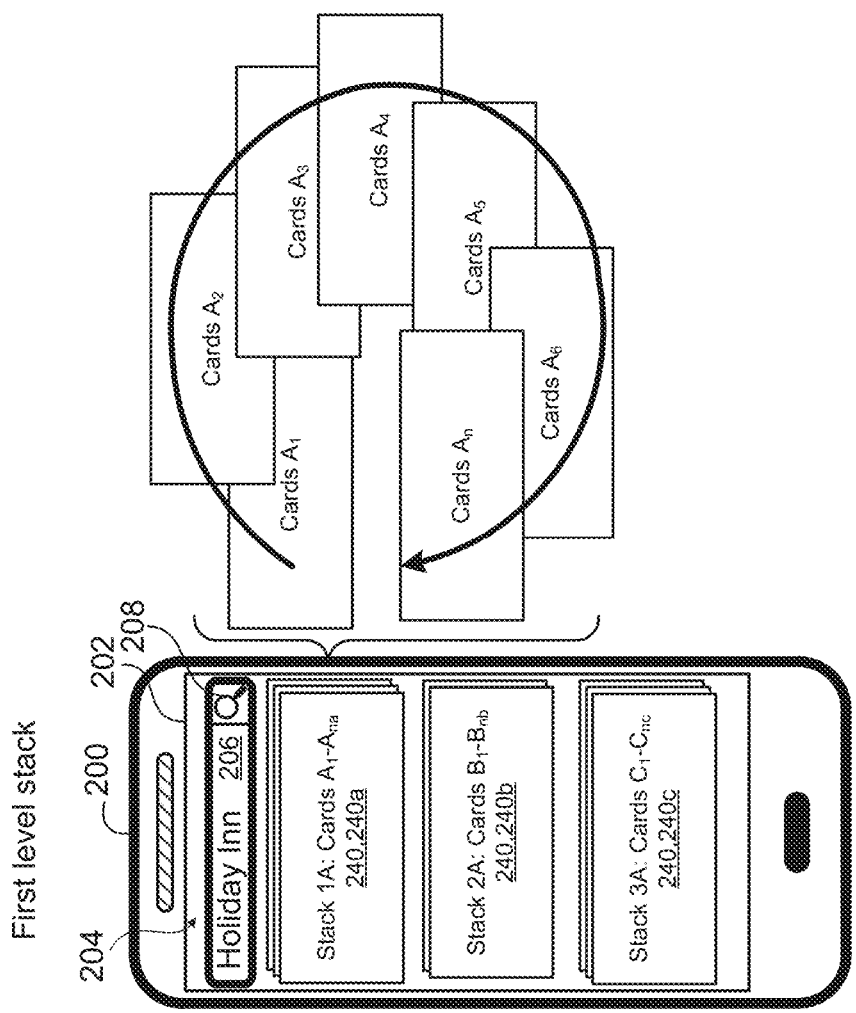

Referring to FIG. 3F, in some implementations, a user 10 may view the cards 220 within a stack 240 (e.g., first, second, third, . . . level stack 240) by inputting a user gesture 12 (e.g., a swipe). In response to a first user gesture 12, the screen 202 displays the first card 220 (Cards A1) of the stack 240. In response to a second user gesture 12, the screen 202 displays the second card 220 (Cards A2) of the stack 240 . . . until all the cards 220 within the stack 240 have been displayed, then the screen 202 displays the first card 220 (Cards A1) of the stack 240 once again.

In some examples, the cards 220 included in a stack 240 may be dimmed out and arranged so that an overlay is displayed on the stack 240 so that a stack title (e.g., Stack 1A, Stack 2A, Stack 3A, Stack 3B . . . ) is displayed. Similarly, each card 220 may have a title or a name that indicates the grouping of the search results that the card 220 provides.

Figure 4D:
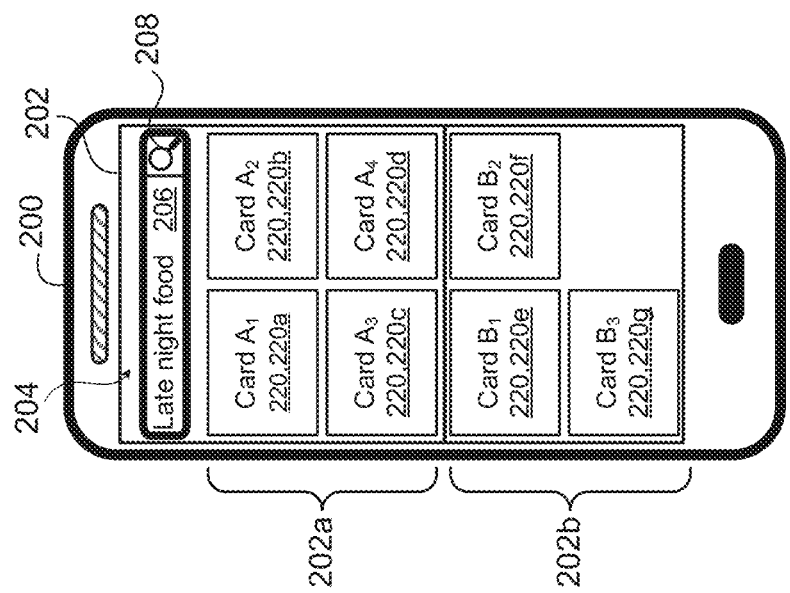

Referring to FIGS. 4A-4D, in some implementations, the search system 400 executes a search based on a user query 206 and the grouping system 400 groups the search results 215 into cards 220 and subsequently first-level stacks 240a, using the screen 202 displays the first-level stacks 240a in response to execution of the search. As shown in FIG. 4A, the user 10 entered "food" as a search query 206. In response to the search query 206, the screen 202 displays the first-level stacks 240a, e.g., Stack 1A, Stack 2A, Stack 3A. The first first-level stack 240aa (Stack 1A) may be titled "Fast food" and includes cards 220 associated with fast food restaurants. The second first-level stack 240ab (Stack 2A) may be titled "Lebanese Food" and includes cards 220 associated with Lebanese restaurants. The third first-level stack 240ac (Stack 3A) may be titled "Pizza" and includes cards 220 associated with Pizza restaurants. The user 10 may select the first first-level stack 240aa (Stack 1A), which may be titled "Fast food", for example, by single or double tapping the screen 202 over the first first-level stack 240aa (Stack 1A), by pinching and, among other user gestures 12. In response to the user input 12, the grouping system 400 expands the selected first-level stack 240a (Stack 1A) to display the cards 220 associated with the selected first-level stack 240aa (Stack 1A). Since the first-level stack 240aa (Stack 1A) is associated with fast food restaurants, the cards 220 grouped under the first-level stack 240aa (Stack 1A) are also associated with fast food restaurants. For example, each card 220 may be associated with a specific restaurant: Card A1 may be associated with BURGER KING®, Card A2 associated with MCDONALDS®, and CARD A3 associated with TACO BELL®. Since each card 220 represents a collection of similar search results 215 from an application associated with the user device 200, a selection of the first card 220a (Card A1) associated with BURGER KING® may list the search results 215 displayed as user-selectable links 222 relating to BURGER KING®. Referring to FIG. 4C, the screen 202 may show a header 252 of the first card 220a that includes the name of the first card (Card A1), under the header 252, the screen 202 shows the search results 215 associated with the first card (Card A1). In this case, since the first card (Card A1) is BURGER KING®, a first search result 215 displayed as a first link 222aa may be a location of the first BURGER KING® associated with a map application, a second search result 215 displayed as a second link 222ab may be an article relating to BURGER KING®, a third search result 215 displayed as a third user selectable link 222ac may be associated with a menu application that provides the menu of BURGER KING®. As previously described, each result 215 is associated with a card 220 related to an application previously downloaded on the user device 200. In some examples, the same application 210a may be included in the search results 215 associated with multiple cards 220. For example, a map application, e.g., GOOGLE MAPS®, may be included in the results 215 of the first card 220a (Card A1) to provide direction to BURGER KING®, and may also be included in the results 215 associated to the second card 220b (Card A2) associated with MCDONALDS® to provide direction to MCDONALDS®. In some implementations, a user selection of a user-selectable link 222 is associated with a search result 215 executed on an application access mechanism to access a functionality of the application 210a, where the functionality of the application 210a is associated with the header 252 and/or the search query 206. In some examples, each search link 222 is adjacent an icon 262 representing the search result 215 or the related application.

FIG. 4D is an alternate user display to FIG. 4B. As shown in HG. 4D, the display is divided into two sections 202a and 202b. In other examples, the screen 202 may be divided into more than two sections. As shown, each display section 202a, 202b includes cards 220 associated with a respective stack 240. The screen 202 of FIG. 4D allows the user 10 to view cards 220 associated with a stack 240 that the user 10 did not select. As shown, the user selection 12 was to view the cards 220 associated with the first first-level stack 240aa (Stack 1A); however, displaying a smaller card 220 allows the user device 200 to display more cards 220.

FIGS. 5A-5C show a zooming out/in behavior that changes the size of the stacks 240 and allows the user 10 to view more stacks 240. The figures are described with respect to the first-level stacks 240a, but may apply to stacks 240 of any level. FIG. 5A shows the screen 202 having multiple stacks 240. In response to a user input 12, the grouping system 400 zooms out and displays by way of the GUI 204, a number N of stacks 240 greater than a number M of stacks 240 displayed in FIG. 5A. In response to another user input 12, the grouping system 400 zooms out and displays by way of the GUI 204 a number P of stacks 240 greater than the number M of stacks displayed in FIG. 5B. A reverse action may also be possible. When the user 10 is viewing the stacks 240, as shown in FIG. 5C, in response to a user input 12 (e.g., zooming in input), the grouping system 400 displays by way of the GUI 204 the number N stacks 240 as shown in FIG. 5B being less than the number P of stacks 240 as shown in FIG. 5C. In addition, in response to another user input 12 (e.g., zooming in input), the grouping system 400 displays by way of the GUI 204 the number M of stacks 240 shown in FIG. 5A that is less than the number N of stacks 240 shown in FIG. 5B. Therefore, the user 10 may view a variable number of stacks 240 within the same level. In addition, (as previously described) the user 10 may further group (or expand) the stacks 240 by grouping more stacks 240 together, i.e., moving between different stack levels.

Referring to FIGS. 6A and 6B, in some implementations, the screen 202 shows via the GUI 204, a thickness 242 of the cards 220 within a stack 240. A thickness 242 indicates how many cards 220 may be within a stack 240. Referring to FIG. 6A, the thickness 242 of the first stack 240a is greater than the thickness 242 of the second stack 240b or the third stack 240c. FIG. 6B shows a different way of displaying the thickness 242. In this case, a border or shadow is displayed behind the stack 240 to indicate the thickness 242. A thicker border or shadow 242 indicates that the stack 240 includes greater number of cards 220. In another examples, each stack 240 may have a displayed number (not shown) indicating the number of cards 220 within the stack 240. Other ways of displaying the number or approximate number of cards 220 are also possible.

Referring to FIGS. 7A-7B, in some implementations, stacks 240 (first, second, third . . . level stacks) may be shown as displayed in FIG. 7A, and the user 10 may input a user gesture 12 (e.g., pinching out, or tapping) that organizes the stacks 240 based on applications, i.e., all the stacks 240 are re-grouped based on corresponding applications. FIG. 7B shows the stacks 240 of FIG. 7A re-grouped based on a corresponding application APP 1-APPN. As shown, each displayed application card 250a-250n includes the cards 220 associated with the application. In addition, each application card 250 shows a thickness 242 representing the number of search results 215 associated with each application. If a user 10 inputs "late night food" as a search query 206 in FIG. 7A, the grouping system 400 may generate the results and group them either into stacks 240 (as shown in FIG. 3B), or into cards 220 (as shown in FIG. 3A), upon a user input 12 (e.g., pinching out or double tapping on the screen 202), the GUI 204 displays the results 215 based on their grouping with a corresponding application 210. If the user 10 selects a displayed application card 250 (e.g., APP 1 250a), then the GUI 204 displays the results 215 associated with the selected application (similar to the display shown in FIG. 4C). Each search result 215 is displayed as a link 222 to the corresponding application functionality or application states where the search system 400 is configured to generate a list of access mechanisms 212 as the search results 215. In some examples, the first application card 250a (selected by the user 10) is a meal review application; therefore, the GUI 204 displays the application in the header 220a and lists the associated search results 215 as user selectable links 222aa-222an under the header 220a, with each link 222aa-222an representing an application access mechanism 212 to a restaurant review.

In some examples, the user device 200 generates user selectable links 222 based on the received search results 215.

Each user selectable link 222 displayed to the user 10 may include an access mechanism 212. The user 10 may select a user selectable link 222 on the user device 200 by interacting with the link 222 (e.g., touching or clicking the link). In response to selection of a link 222, the user device 200 may launch a corresponding software application 210 (e.g., a native application 210a or a web-browser application 210b referenced by the access mechanism. 212 and perform one or more operations indicated in the access mechanism 212.

Access mechanisms may include at least one of a native application access mechanism (hereinafter "application access mechanism"), a web access mechanism, and an application download mechanism. The user device 200 may use the access mechanisms to access functionality of applications 210. For example, the user 10 may select a user selectable link 222 including an access mechanism in order to access functionality of an application 210 indicated in the user selectable link 222.

An application access mechanism may be a string that includes a reference to a native application and indicates one or more operations for the user device 200 to perform. If a user 10 selects a user selectable link 222 including an application access mechanism, the user device 200 may launch the native application 210 referenced in the application access mechanism and perform the one or more operations indicated in the application access mechanism.

An application access mechanism includes data that the user device 200 can use to access functionality provided by a native application 210. For example, an application access mechanism can include data that causes the user device 200 to launch a native application 210 and perform a function associated with the native application 210. Performance of a function according to the access mechanism may set the native application 210 into a specified state. Accordingly, the process of launching a native application 210 and performing a function according to an application access mechanism may be referred to herein as launching the native application 210 and setting the native application 210 into a state that is specified by the application access mechanism. In some examples, an application access mechanism for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism for an interact media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms may have various different formats and content. The format and content of an application access mechanism may depend on the native application 210 with which the application access mechanism is associated and the operations that are to be performed by the native application 210 in response to selection of the application access mechanism. For example, an application access mechanism for an internet music player application may differ from an application access mechanism for a shopping application. An application access mechanism for an internet music player application may include references to musical artists, songs, and albums, for example. The application access mechanism for an internet music player application may also reference operations, such as randomizing a list of songs and playing a song or album. An application access mechanism for a shopping application may include references to different products that are for sale. The application access mechanism for the shopping application may also include references to one or more operations, such as adding products to a shopping cart and proceeding to a checkout.

The user 10 may select a link 222 that causes the user device 200 to launch the native application 210a identified in the link 222 and perform one or more operations according to the application access mechanism 212a associated with the link 222. Put another way, when the user 10 selects a link 222, the user device 200 launches a native application 210a and sets the native application 210a into a state defined by the application access mechanism 212a associated with the link 222. In general, a state of a native application 210a may refer to the operations and/or the resulting outcome of the native application 210a in response to selection of a link 222. A state of a native application 210a may also be referred to herein as an "application state."

An application state specified by an application access mechanism 212a may depend on the functionality provided by the native application 210a. For example, if a native application 210a is configured to retrieve and display information from the Internet, the native application 210a can be set into a state in which the native application 210a retrieves information from the Internet and displays information to the user 10. In another example, if a native application 210a is configured to play media (e.g., music and/or video) from the Internet, the native application 210a can be set into a state in which the native application 210a is playing a song or a movie from the Internet. In another example, if a native application 210a is configured to make restaurant reservations, the native application 210a can be set into a state in which the native application 210a displays available restaurant reservations to the user 10.

A web access mechanism 212b may include a resource identifier that includes a reference to a web resource (e.g., a page of a web application/website). For example, a web access mechanism 2121) may include a uniform resource locator (URL) (i.e., a web address) used with hypertext transfer protocol (HTTP). If a user 10 selects a user selectable link 222 including a web access mechanism 212b, the user device 200 may launch the web browser application 210b and retrieve the web resource indicated in the resource identifier. Put another way, if a user 10 selects a user selectable link 222 including a web access mechanism 212b, the user device 200 may launch a corresponding web-browser application 210b and access astute (e.g., a page) of a web application/website. In some examples, web access mechanisms 212b include URLs for mobile-optimized sites and/or full sites.

The web access mechanism 212b included in an application state record 800 may be used by a web browser to access a web resource that includes similar information and/or performs similar functions as would be performed by a native application 210a that receives an application access mechanism 212a of the application state record 800. For example, the web access mechanism 212b of an application state record 800 may direct the web-browser application 210b of the user device 200 to a web version of the native application 210a referenced in the application access mechanisms 212a of the application state record 800. Moreover, if the application access mechanisms 212 included in an application state record 800 for a specific Mexican restaurant cause each application edition to retrieve information for the specific Mexican restaurant, the web access mechanism 212b may direct the web-browser application 210b of the user device 200 to a web page entry for the specific Mexican restaurant.

An application download mechanism 212c may indicate a location (e.g., a digital distribution platform 130b) where a native application 210a can be downloaded in the scenario where the native application 210a is not installed on the user device 200. If a user 10 selects a user selectable link 222 including an application download mechanism 212a, the user device 200 may access a digital distribution platform from which the referenced native application 210a may be downloaded. The user device 200 may access a digital distribution platform 130b using at least one of the web-browser application 210b and one of the native applications 210a.

As previously described, the grouping system 400 groups the search results 215 into cards 220 and/or stacks 240 based on one or more grouping rules and/or attributes 422. For example, the cards 220 may be grouped based on their associated application (FIGS. 7A-7C), or categories such as, but not limited to, web category, image category, shopping category, video category, news category, application category, maps category, or type such as, but not limited to, food, movies, or location. In some examples, the first level-stack 240a may be based on one grouping condition 422 and another grouping may be based on a different condition 422. The user 10 may create personal stacks 240 by dragging one or more cards 220 on top of another card 220 to form the personal stack 240. In additional examples, the user 10 may touch two cards 220 at the same time and pinch them together, resulting in grouping the cards together in a stack 240. The grouping system 400 groups the search results 215 within a card 220 or the cards 220 in a stack 240 based on application state records 800 or entity records 900 (stored in the grouping data store 420).

Figure 8B:
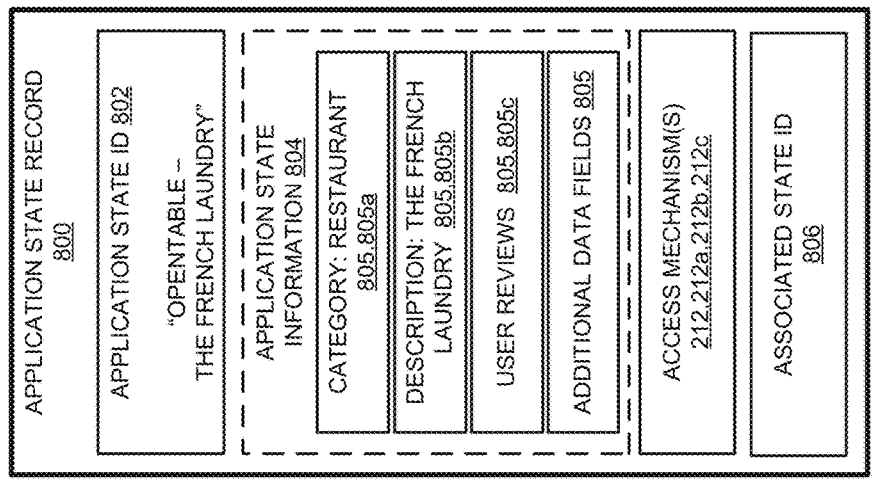
FIGS. 8A and 8B are schematic views of example application state records.
Figure 8A:
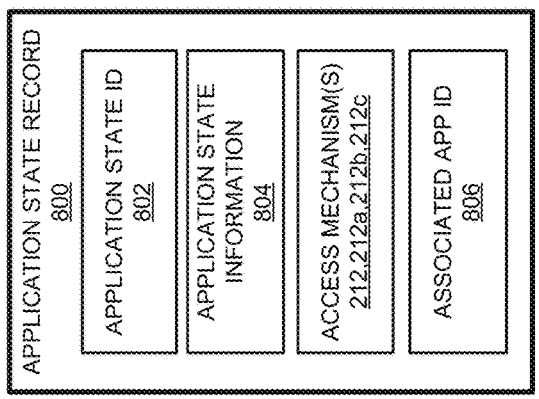

Referring to FIGS. 8A and 8B, the search data store 320 and/or grouping data store 420 includes a plurality of different application state records 800. Each application state record 800 may include data related to a function of an application 210 and/or the state of the application 210 resulting from performance of the function. An application state record 800 may include an application state identifier (ID) 802, application state information 804, an application identifier (ID) 806, and one or more access mechanisms 212, 212a, 212b, 212c used to access functionality provided by an application 210.

The application state ID 802 may be used to identify the application state record 800 among the other application state records 800 included in the search data store 320. The application state ID 802 may be a string of alphabetic, numeric, and/or symbolic characters (e.g., punctuation marks) that uniquely identifies the associated application state record 800. In some examples, the application state ID 802 describes a function and/or an application state in human readable form. For example, the application state ID 802 may include the name of the application 210 referenced in the access mechanism(s) 212. In a specific example, an application state ID 802 for an interact music player application may include the name of the internet music player application along with the song name that will be played when the interact music player application is set into the state defined by the application access mechanism included in the application state. Additionally or alternatively, the application state ID 802 may be a human readable string that describes a function performed according to the access mechanism(s) 212 and/or an application state resulting from performance of the function according to the access mechanism(s) 212. In some examples, the application state ID 802 includes a string in the format of a uniform resource locator (URL) of a web access mechanism 212b for the application state record 800, which may uniquely identify the application state record 800. In some examples, the string may include multiple parameters used to retrieve the corresponding application state record 800. In addition, some parameters may be user-generated, which means that the parameters put the application in a new application state record 800 that has not been previously executed. Thus, the user-selectable link 222 may not explicitly correspond to a known end result inside the application, but simply fits a known link expression that the application accepts. For example, the UBER application may display a user selectable link 222 that uses a latitude and longitude as a parameter to determine location.

In a more specific example, if the application state record 800 describes a function of the YELP® native application, the application state ID 802 may include the name "Yelp" along with a description of the application state described in the application state information 804. For example, the application state ID 802 for an application state record 800 that describes the restaurant named "The French Laundry" may be "Yelp—The French Laundry." in an example where the application state ID 802 includes a string in the format of a URL, the application state ID 802 may include the following string "http://www.yelp.com/biz/the-french-laundry-yountville-2?ob=1" to uniquely identify the application state record 800. In additional examples, the application state ID 802 may include a URL using a namespace other than "http://," such as "func://," which may indicate that the URL, is being used as an application state ID in an application state. For example, the application state ID 802 may include the following string "func://www.yelp.com/biz/the-french-laundry-yountville-2?ob=1."

The application state information 804 may include data that describes an application state into which an application 210 is set according to the access mechanism(s) 212 in the application state record 800. Additionally or alternatively, the application state information 804 may include data that describes the function performed according to the access mechanism(s) 212 included in the application state record 800. The application state information 804 may include text, numbers, and symbols that describe the application state. The types of data included in the application state information 804 may depend on the type of information associated with the application state and the functionality specified by the application access mechanism 212a. The application state information 804 may include a variety of different types of data, such as structured, semi-structured, and/or unstructured data. The application state information 804 may be automatically and/or manually generated based on documents retrieved from the data sources 130. Moreover, the application state information 804 may be updated so that up-to-date search results 215 are provided in response to a search query 206.

In some examples, the application state information 804 includes data that may be presented to the user 10 by an application 210 when the application 210 is set in the application state defined by the access mechanism(s) 212. For example, if one of the access mechanism(s) 212 is an application access mechanism 212a, the application state information 804 may include data that describes a state of the native application 210a after the user device 200 has performed the one or more operations indicated in the application access mechanism 212a. For example, if the application state record 800 is associated with a shopping application, the application state information 804 may include data that describes products (e.g., names and prices) that are shown when the shopping application is set to the application state defined by the access mechanism(s) 212. As another example, if the application state record 800 is associated with a music player application, the application state information 804 may include data that describes a song (e.g., name and artist) that is played when the music player application is set to the application state defined by the access mechanism(s) 212.

The types of data included in the application state information 804 may depend on the type of information associated with the application state and the functionality defined by the access mechanism(s) 212. For example, if the application state record 800 is for an application 210 that provides reviews of restaurants, the application state information 804 may include information (e.g., text and numbers) related to a restaurant, such as a category of the restaurant, reviews of the restaurant, and a menu for the restaurant. In this example, the access mechanism(s) 212 may cause the application 210 (e.g., a native application 210*a* or a web-browser application 210*b*) to launch and retrieve information relating to the restaurant. As another example, if the application state record 800 is for an application 210 that plays music, the application state information 804 may include information relating to a song, such as the name of the song, the artist, lyrics, and listener reviews. In this example, the access mechanism(s) 212 may cause the application 210 to launch and play the song described in the application state information 804.

The search system 300 may generate application state information 804 included in an application state record 800 in a variety of different ways. In some examples, the search system 300 retrieves data to be included in the application state information 804 via partnerships with database owners and developers of native applications 2110*a*. For example, the search system 300 may automatically retrieve the data from online databases 130*f* that include, but are not limited to, data related to movies, television programs, music, and restaurants. In some examples, a human operator manually generates some data included in the application state information 804. The search system 300 may update data included in the application state information 804 over time so that the search system 300 provides up-to-date results 215 to the user 10.

The application ID 806 may be used to identify a native application 210*a* associated with the application state record 800. The application ID 806 may be a string of alphabetic, numeric, and/or symbolic characters (e.g., punctuation marks) that uniquely identifies the associated native application 210*a*. In some examples, the application ID 806 the native application 210*a* in human readable form. For example, the application ID 806 may include the name of the application 210 referenced in the access mechanism(s) 212. In some examples, the application ID 806 for a restaurant finder application 210 may include the name of the restaurant finder application.

An application state record 800 includes an application access mechanism 212 that causes an application 210 to launch into a default state may include application state information 804 describing the native application 210*a*, instead of any particular application state. For example, the application state information 804 may include the name of the developer of the application 210, the publisher of the application 210, a category 805*a* (e.g., genre) of the application 210, a description 805*b* of the application 210 (e.g., a developer's description), and a price of the application 210. The application state information 804 may also include security or privacy data about the application 210, battery usage of the application 210, and bandwidth usage of the application 210. The application state information 804 may also include application statistics. Application statistics may refer to numerical data related to a native application 210*a*. For example, application statistics may include, but are not limited to, a number of downloads, a download rate (e.g., downloads per month), a number of ratings, and a number of reviews.

FIG. 8B shows an example application state record 800 associated with the OPENTABLE® application, developed by OpenTable, Inc. The OPENTABLE® application is a restaurant-reservation application that allows users 10 to search for restaurants and make restaurant reservations. The OPENTABLE® application provides information about restaurants including descriptions of restaurants and user reviews of the restaurants. The example application state record 800 of FIG. 3B describes an application state of the OPENTABLE® application in which the OPENTABLE® application accesses information for THE FRENCH LAUNDRY® restaurant.

The example application state record 800 includes an application state ID 802 of "OPENTABLE—THE FRENCH LAUNDRY," which may be used as a unique identifier to identify the application state record 800. In other examples, the application state ID 802 includes a URL as a unique identifier for the application state record 800. For example, the application state ID 802 may include the string "http://www.opentable.com/the-french-laundry" as a unique identifier for the application state record 800. As described herein, such an application state ID 802 may be included in a web access mechanism 212*b* of an application state record 800. As another example, the application state ID 802 may have a different namespace than "http://," such as "func://." In yet another example, the application state ID 802 could be a string of characters, numbers, and/or symbols that are not in human readable form. Each example is optional and may be combined with other examples.

The example application state information 804 includes data fields 805, such as a category 805*a* of THE FRENCH LAUNDRY® restaurant, a description 805*b* of THE FRENCH LAUNDRY® restaurant, user reviews 805*c* of THE FRENCH LAUNDRY® restaurant, and additional data fields 805. The restaurant category 805*a* field may include the text "French cuisine" and "contemporary," for example. The description field 805*b* may include text that describes THE FRENCH LAUNDRY® restaurant. The user reviews field 805*c* may include text of user reviews for THE FRENCH LAUNDRY® restaurant. The additional data fields 805 may include additional data for THE FRENCH LAUNDRY® restaurant that may not specifically fit within the other defined fields, such as a menu for the restaurant, prices, and operating hours for the restaurant.

The application state record 800 includes one or more access mechanism(s) 212. The access mechanism(s) 212 may include a reference to the OPENTABLE® application 210. An example application access mechanism 212*a* for the application state record 800 may include a reference to the OPENTABLE® native application 210*a* along with one or more operations to be performed by the user device 200. For example, the application access mechanism 212*a* may include an application resource identifier and/or one or more operations that cause the user device 200 to access the entry for THE FRENCH LAUNDRY® restaurant in the OPENTABLE® native application. An example application resource identifier may be "vnd.opentable.deeplink://opentable.com/restaurant/profile?rid=1180&refid=1."

In some implementations, an application state record 800 includes multiple different application access mechanisms 212, 212a, 212b, 212c that may include a variety of information. The application access mechanism 212 may include edition information that indicates the application edition with which the application access mechanism 212 is compatible. For example, the edition information indicates the operating system 216 with which the application access mechanism 212 is compatible. Moreover, different application access mechanisms 212 may be associated with different editions of a native application 210a. A native application edition (hereinafter "application edition") refers to a particular implementation or variation of a native application 210a. For example, an application edition may refer to a version of a native application 210a, such as a version 1.0 of a native application 210a or a version 2.0 of a native application 210a. In another example, an application edition may refer to an implementation of a native application 210a for a specific platform, such as a specific operating system 216.

The different application access mechanisms 212 included in an application state record 800 may cause the corresponding application editions to launch and perform similar functions. Accordingly, the different application access mechanisms 212 included in an application state record 800 may cause the corresponding application editions to be set into similar application states. For example, if the different application access mechanisms 212 reference different editions of an information retrieval application, the different application access mechanisms 212 may cause the corresponding application editions to retrieve similar information. In another example, if the different application access mechanisms 212 reference different editions of an internet music player application, the different application access mechanisms 212 may cause the corresponding application editions to play the same song.

In some examples, an application state record 800 for a native application that retrieves restaurant information may include multiple different application access mechanisms 212 for multiple different application editions. Assuming the application state record 800 is associated with a specific Mexican restaurant, the application access mechanisms 212 for the different application editions may cause each application edition to retrieve information for the same specific Mexican restaurant. For example, a first application access mechanism 212 may cause a first application edition (e.g., on first operating system) to retrieve information for the specific Mexican restaurant. A second application access mechanism 212 may cause a second application edition (e.g., on a second operating system) to retrieve information for the specific Mexican restaurant. In some examples, the search system 300 can determine whether to transmit the application access mechanism 212 in the search results 215 based on whether the user device 200 is configured to receive the application access mechanism 212.

Referring to FIGS. 9A and 9B, the search data store 320 and/or grouping data store 420 includes a plurality of entity records 900. Each entity record 900 may include data related to an entity. The entity can be a business or place with a geolocation or person or event (e.g., restaurants, bars, gas stations, supermarkets, movie theaters, doctor offices, sports team, movie star, celebrity, politician, parks, and libraries, etc.). An entity record 900 may include an entity identifier or name (ID) 902, entity location data 906 (e.g., geolocation data), an entity category 908 (and optionally one or more sub-categories 908a-908n), and/or entity information 904.

The entity ID 902 may be used to identify the entity record 900 among the other entity records 900 included in the data store 320 and/or grouping data store 420. The entity ID 902 may be a string of alphabetic, numeric, and/or symbolic characters (e.g., punctuation marks) that uniquely identifies the associated entity record 900. In some examples, the entity ID 902 describes the entity in human readable form. For example, the entity ID 902 may include the name string of the entity or a human readable form identifying the entity. In some examples, the entity ID 902 includes a unique number that identifies the entity.

In a more specific example, if the entity record 900 describes a restaurant named POTBELLY®, the entity ID 902 for the entity record 900 can be "Potbelly." In an example where the entity ID 902 includes a string in human readable form and/or a URL, the entity ID 902 may include the following string "Potbelly" to uniquely identify the entity record 900. Other unique identifiers are possible as well, such as a store number.

The entity information 904 may include any information about the entity, such as text (e.g., description, reviews) and numbers (e.g., number of reviews). This information may even be redundant to other information contained in the entity record 900, but optionally structured for display, for example. The entity information 904 may include a variety of different types of data, such as structured, semi-structured, and/or unstructured data. Moreover, the entity information 904 may be automatically and/or manually generated based on documents retrieved from the data sources 130.

The entity location data 906 may include data that describes a location of the entity. This data may include a geolocation (e.g., latitude and longitude coordinates), a street address, or any information that can be used to identify the location of the entity. In some implementations, the entity location data 906 defines a geo-location associated with the application state record 800.

The entity category 908 provides a classification or grouping of the entity. Moreover, the entity category 908 can have one or more sub-categories 908a to further classify the entity. For example, the entity record 900 could have an entity category 908 of "Restaurant" and a sub-category 908a of a type of cuisine, such as "Sandwich Shop," "French cuisine," or "contemporary." Any number of sub-categories 908a-908n may be assigned to classify the entity for use during a search.

Figure 10:
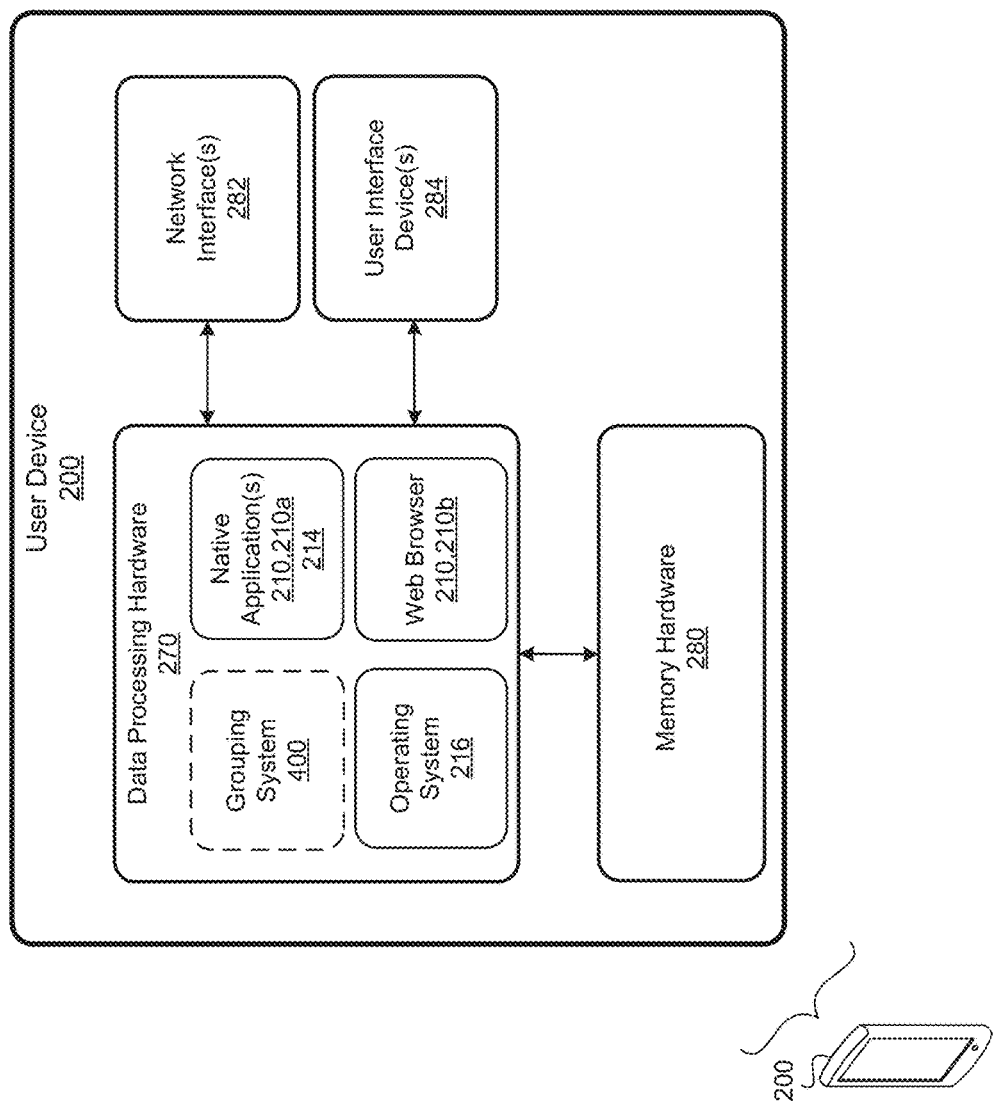
FIG. 10 is a schematic view of an example user device.

FIG. 10 illustrates an example user device 200 including data processing hardware 270 in communication with memory hardware 280, a network interface device 282, and a user interface device 284 (e.g. screen). The user device 200 may include other components as well. The data processing hardware 270 is configured to execute instructions stored on the memory hardware 280 that when executed on the data processing hardware 270 cause the data processing hardware 270 to perform operations. In some examples, the data processing hardware 270 executes one or more of a native application 210a, a web browser 210b, and an operating system 216, all of which may be embodied as computer readable instructions. The operating system 216 may act as an interface between the data processing hardware 270 and the applications 210.

In some implementations, the data processing hardware 270 executes a search application 214. The search application 214 is a set of computer readable instructions embedded in a native application 210a, i.e., the search application 214. In the example shown, the data processing hardware 270 executes the grouping module 410 and the memory hardware 280 includes the grouping data store 420. In other examples, the grouping data store 420 is located remotely from the user device 200.

The memory hardware 280 may be physical devices used to store programs (e.g., sequences of instructions) or data (e.g., program state information) on a temporary or permanent basis as non-transitory memory for use by a computing device. For example, the memory hardware 280 may store the computer readable instructions that make up the native applications 210a, the web browser 210b, the operating system 216, the search application 214, and/or the grouping module 410. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), and phase change memory (PCM). The network interface device 282 includes one or more devices configured to communicate with the network 120.

The network interface 282 can include one or more transceivers for performing wired or wireless communication. Examples of the network interface 282 include, but are not limited to, a transceiver configured to perform communications using the IEEE 802.11 wireless standard, an Ethernet port, a wireless transmitter, and a universal serial bus (USB) port. The user interface 284 includes one or more devices that receive input from and/or provide output to a user 10. The user interface 284 can include, but is not limited to, a touchscreen, a display, a QWERTY keyboard, a numeric keypad, a touchpad, a microphone, and/or speakers.

Figure 11:
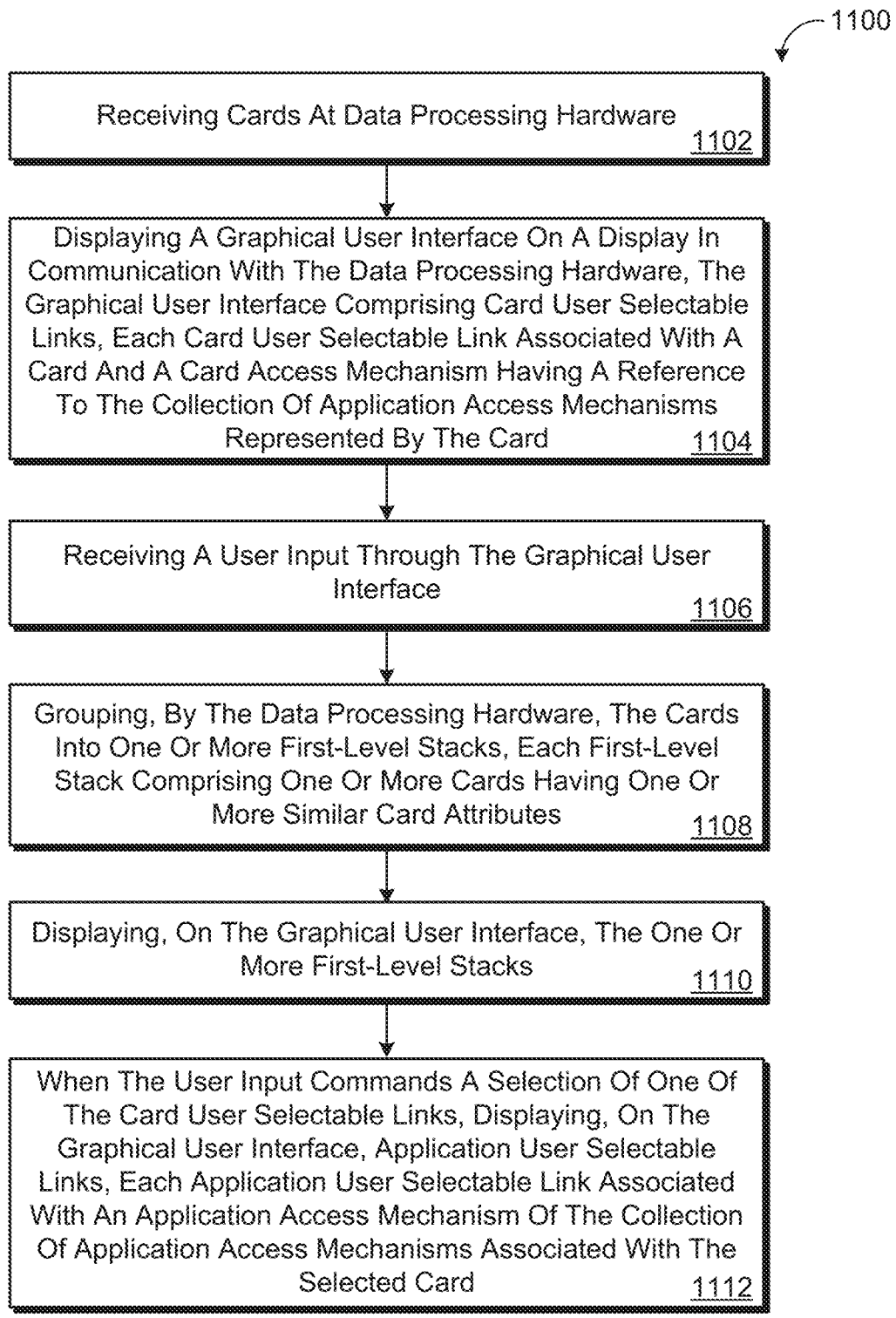
FIG. 11 is an example arrangement of operations for a method of grouping applications for display on a user display.

FIG. 11 provides an example arrangement of operations for a method 1100 of grouping and ungrouping cards 220 of a user device screen 202. The method 1100 is described with respect to the user device 200 and the grouping system 400 as illustrated FIGS. 1-9B.

At block 1102, the method 1100 includes receiving cards 220 at data processing hardware. Each card 220 represents a collection of application access mechanisms 212 (e.g., search results), each application access mechanism 212 having reference to a corresponding application 210 executable on the data processing hardware and indicating a performable operation for the corresponding application 210. The collection of application access mechanisms 212 has one or more similar application access mechanism attributes 422. At block 1104, the method 1100 also includes displaying a graphical user interface 204 on a screen 202 in communication with the data processing hardware, the graphical user interface 204 including card user selectable links. Each card user selectable link is associated with a card 220 and a card access mechanism having a reference to the collection of application access mechanisms 212 represented by the card 220. At block 1106, the method 1100 further includes receiving a user input 12 through the graphical user interface 204. When the user input 12 commands a first-level grouping operation for grouping one or more cards 220, at block 1108 the method 1100 includes grouping, by the data processing hardware, the cards 220 into one or more first-level stacks 240a, and at block 1110, displaying on the graphical user interface 204, the one or more first-level stacks 240a. Each first-level stack 240a includes one or more cards 220 having one or more similar card attributes. At block 1112, the method 1100 further includes displaying, when the user input 12 commands a selection of one of the card user selectable links, displaying, on the graphical user interface 204, application user selectable links. Each application user selectable link is associated with an application access mechanism 212 of the collection of application assess mechanisms 212 associated with the selected card 220.

In some implementations, the method 1100 includes receiving, at the data processing hardware, a search query through the graphical user interface 204; and determining, by the data processing hardware, one or more result sets based on the search query. Each result set includes a collection of application access mechanisms 212.

The user input 12 may include at least one of a voice command, a touch gesture, or a click selection. The touch gesture may include receiving one or more user touch interactions with the graphical user interface 204. The touch gesture may include at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display when the two finger swipes substantially converge at a common point.

In some examples, after displaying the one or more first-level stacks 240a, the method 1100 includes receiving a subsequent user input 12 through the user interface. The subsequent user input 12 may command a second-level grouping operation for grouping one or more first-level stacks 240a. The method 1100 may further include grouping, by the data processing hardware, the first-level stacks 240 into one or more second-level stacks 240b, each second-level stack 240b including one or more first-level stack 240a having one or more similar first-level stack attributes. The method 1100 may further include displaying, on the graphical user interface 204, the one or more second-level stacks 240b.

When the user input 12 commands a zooming operation and when the graphical user interface 204 displays one or more cards 220, the method 1100 may include determining, by the data processing hardware, a first number of displayed cards 220; and displaying, on the graphical user interface 204, a second number of cards 220 not equal to the first number of cards 220 When the graphical user interface 204 displays the one or more first-level stacks 240a, the method 1100 may include determining, by the data processing hardware, a first number of displayed first-level stacks 240; and displaying, on the graphical user interface 204, a second number of first-level stacks 240 not equal to the first number of first-level stacks 240.

The method 1100 may further include receiving, at the data processing hardware, a selection of an application user selectable link; and executing, by the data processing hardware, an application referenced by the application user selectable link. The application access mechanism attributes and the card attributes may include at least one of an application identifier, an application state action, an application category, an entity name, an entity location, or a type including web, image, video, and/or news. Each corresponding application may be stored on memory hardware in communication with the data processing hardware.

Figure 12:
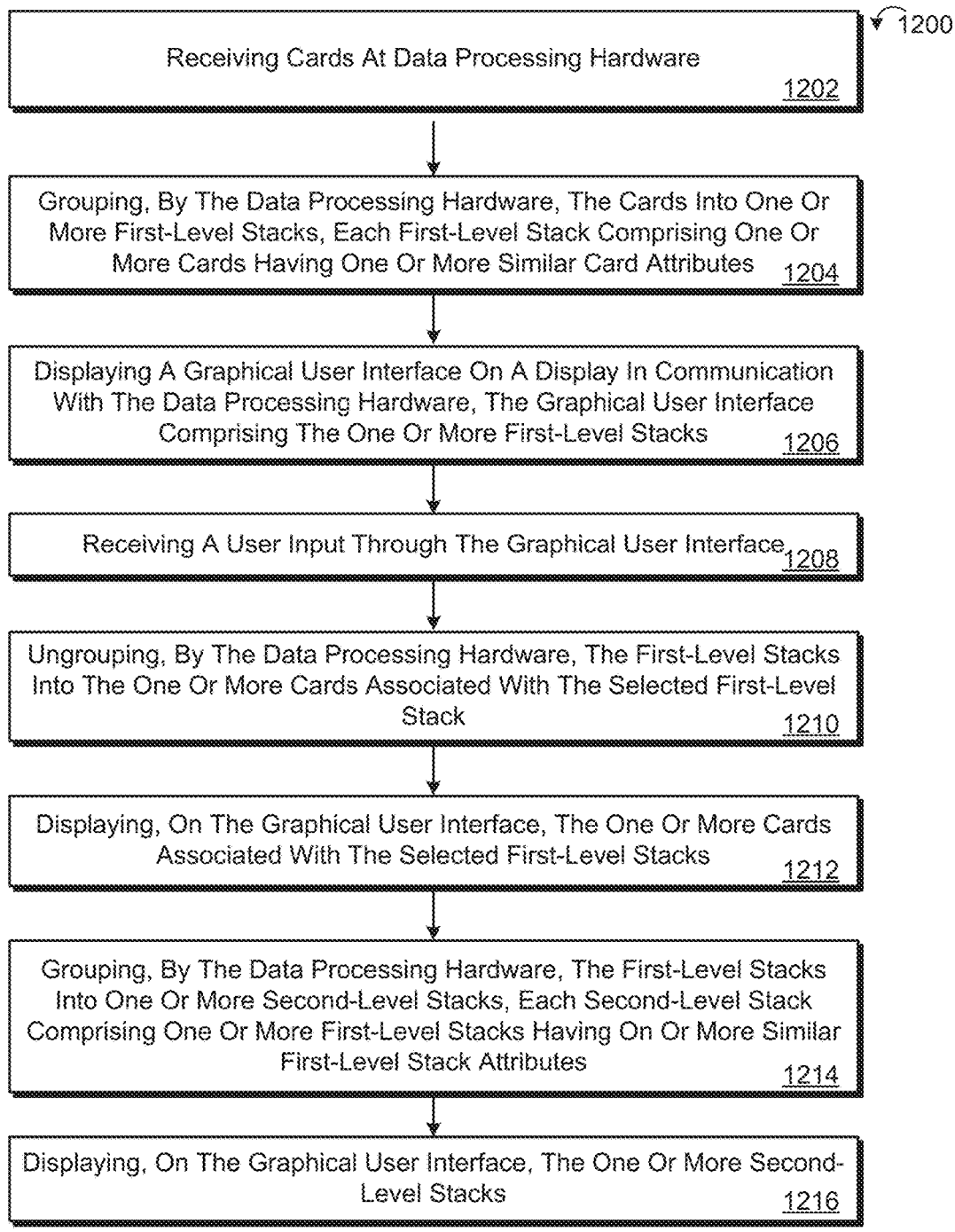
FIG. 12 is an example arrangement of operations for a method of ungrouping applications for display on a user display

FIG. 12 provides an example arrangement of operations for a method 1200 of grouping and ungrouping cards 220 of a user device screen 202. The method 1200 is described with respect to the user device 200 and the grouping system 400 as illustrated in FIGS. 1-9B.

At block 1202, the method 1200 includes receiving cards 220 at data processing hardware. Each card 220 represents a collection of application access mechanisms 212 (e.g., search results), each application access mechanism 212 having reference to a corresponding application executable on the data processing hardware and indicating a performable operation for the corresponding application. The collection of application access mechanisms 212 has one or more similar application access mechanism attributes. At block 1204, the method 1200 further includes grouping, by the data processing hardware, the cards 220 into one or more first-level stacks 240*a*. Each first-level stack 240*a* includes one or more cards 220 having one or more similar card attributes. At block 1206, the method 1200 also includes displaying a graphical user interface 204 on a display in communication with the data processing hardware. The graphical user interface 204 includes the one or more first-level stacks 240*a*. At block 1208, the method 1200 further includes receiving a user input through the graphical user interface 204. When the user input commands a first-level ungrouping operation for the one or more first-level stacks 240*a*, at block 1210 the method 1200 includes ungrouping, by the data processing hardware, the first-level stacks 240 into the one or more cards 220 associated with the selected first-level stack 240, and at block 1212, displaying, on the graphical user interface 204, the one or more cards 220 associated with the selected first-level stack 240. When the user input 12 commands a second-level grouping operation for the one or more first-level stacks 240*a*, at block 1214, the method 1200 includes grouping, by the data processing hardware, the first-level stacks 240 into one or more second-level stacks 240*b*, each second-level stack 240*b* including one or more first-level stacks 240*a* having one or more similar first-level stack attributes, and at block 1216, displaying, on the graphical user interface 204, the one or more second-level stacks.

In some examples, the method 1200 includes after displaying the one or more cards 220 associated with the selected first-level stack 240, receiving a subsequent user input 12 through the graphical user interface 204. The subsequent user input 12 commands a selection of card user selectable links associated with a card 220 and a card access mechanism having a reference to the collection of application access mechanisms 212 represented by the card 220. The method 1200 may further include displaying, on the graphical user interface 204, application user selectable links. Each application user selectable link may be associated with an application access mechanism 212 of the collection of application assess mechanisms 212 associated with the selected card 220.

In some implementations, the method 1200 includes receiving, at the data processing hardware, a selection of an application user selectable link; and executing, by the data processing hardware, an application referenced by the application user selectable link. The method 1200 may also include receiving, at the data processing hardware, a search query through the graphical user interface 204; and determining, by the data processing hardware, one or more result sets based on the search query, each result set including a collection of application access mechanisms.

The user input includes at least one of a voice command, a ouch gesture, or a click selection. The touch gesture may include receiving one or more user interactions with the graphical user interface 204. The touch gesture may include at least one of a pinching gesture indicative of two finger swipes moving towards each other at substantially the same time, a swiping gesture indicative of one or more substantially simultaneous finger swipes in a common direction, or a raised pinching gesture indicative of two finger swipes moving towards each other followed by a release of the finger swipes from the display 204 when the two finger swipes substantially converge at a common point.

When the graphical user interface 204 displays one or more cards 220, the method 1200 may include determining, by the data processing hardware, a first number of displayed cards 220, and displaying, on the graphical user interface 204, a second number of cards 220 not equaling the first number of cards 220. When the graphical user interface 204 displays the one or more first-level stacks 240*a*, the method 1200 may include determining, by the data processing hardware, a first number of displayed first-level stacks 240, and displaying, on the graphical user interface 204, a second number of first-level stacks 240 not equaling the first number of first-level stacks 240. When the graphical user interface 204 displays the one or more second-level stacks 240*b*, the method 1200 includes determining, by the data processing hardware, a first number of displayed second-level stacks 240*b*, and displaying, on the graphical user interface 204, a second number of second-level stacks 240*b* not equaling the first number of second-level stacks 240*b*.

In some examples, the application access mechanism attributes, the card attributes, and the first-level stack attributes include at least one of: an application identifier, an application state action, an application category, an entity name, an entity location, or type including web, image, video, or news. Each corresponding application may be stored on memory hardware in communication with the data processing hardware.

Figure 13:
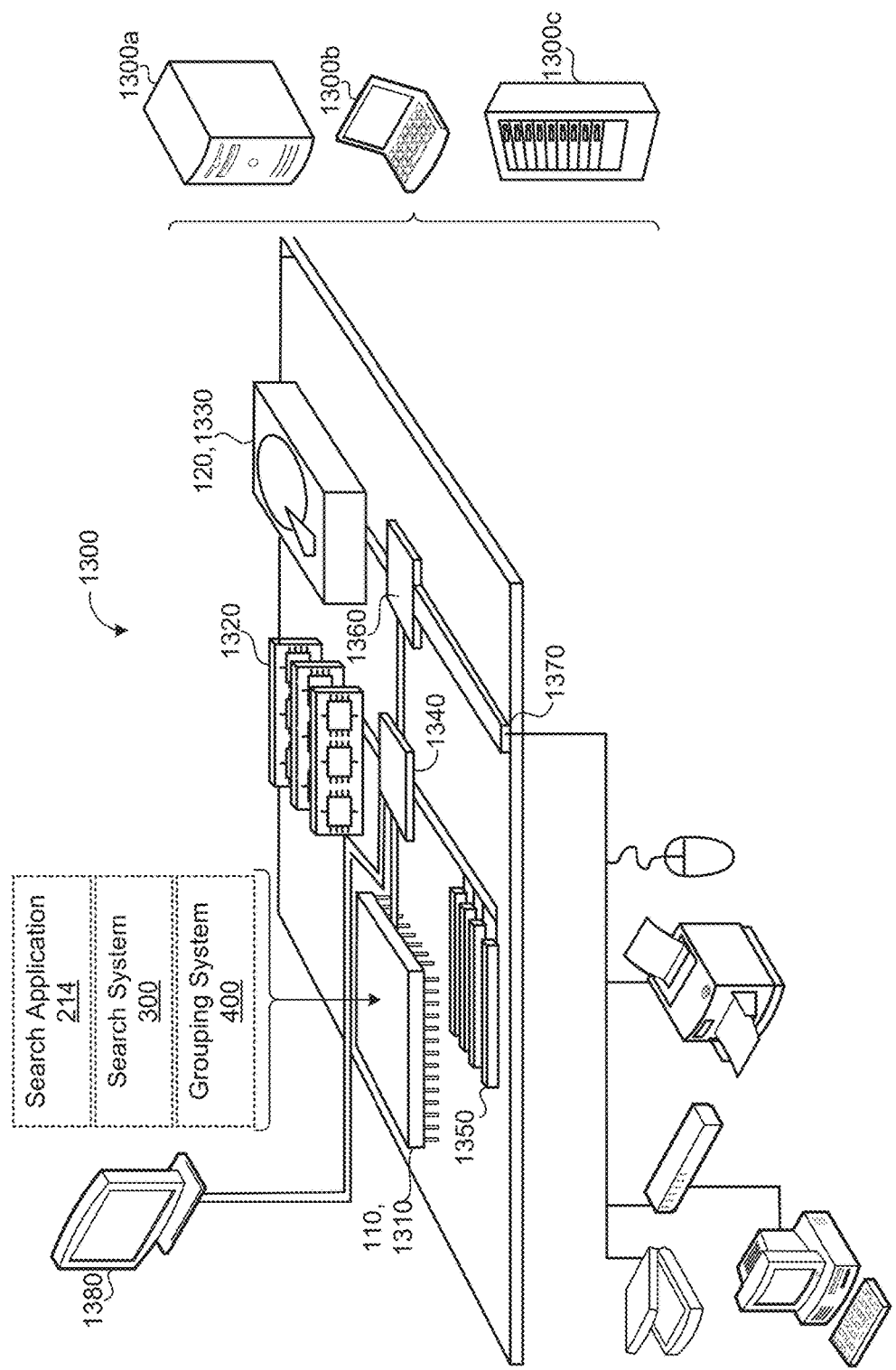
FIG. 13 is a schematic view of an example computing device executing any systems or methods described herein.

FIG. 13 is schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1300 includes a processor 110, 1310, memory 1320, a storage device 120, 1330, a high-speed interface/controller 1340 connecting to the memory 1320 and high-speed expansion ports 1350, and a low speed interface/controller 1360 connecting to low speed bus 1370 and storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as screen 202, 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The non-transitory memory 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), and phase change memory (PCM).

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and low-speed expansion port 1370. The low-speed expansion port 1370, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1300 may be implemented in a number of different forms, as shown in the figure. For example, it may be implemented as a standard server 1300a or multiple times in a group of such servers 1300a, as a laptop computer 1300b, or as part of a rack server system 1300c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A method comprising:
  displaying a graphical user interface (GUI) on a display of a user device;
  receiving, by the user device, a search query inputted via the GUI, wherein the search query includes a category type;
  determining, by the user device, a set of results based on the search query, wherein each result in the set of results is associated with an application installed on the user device;
  receiving, by the user device, cards, wherein each card is associated with:
    at least one result of the set of results,
    a collection of application access mechanisms having one or more similar application access mechanism attributes, wherein each application access mechanism (i) references an application executable on the user device and (ii) defines an application state of the referenced application, and
    a category type;

grouping, by the user device, the cards into a plurality of first-level stacks, wherein:
  a first first-level stack of the plurality of first-level stacks includes a set of cards associated with the category type included in the search query, and
  a second first-level stack of the plurality of first-level stacks includes a set of cards not associated with the category type included in the search query;
displaying on the GUI the plurality of first-level stacks;
receiving a first user input through the GUI;
in response to the first user input commanding a first-level ungrouping operation for a selected first-level stack of the plurality of first-level stacks:
  ungrouping, by the user device, the selected first-level stack into one or more cards associated with the selected first-level stack,
  displaying, on the GUI, the one or more cards associated with the selected first-level stack, wherein each card includes (i) a user selectable link associated with the respective card and (ii) a card access mechanism having a reference to the collection of application access mechanisms represented by the respective card,
  receiving a second user input through the GUI,
  in response to the second user input commanding a selection of one of the card user selectable links, displaying on the GUI, application user selectable links, wherein each application user selectable link is associated with an application access mechanism of the collection of application assess mechanisms associated with the selected card,
  receiving a third user input through the GUI, and
  in response to the third user input commanding a selection of an application user selectable link, executing, by the user device, an application referenced by the application user selectable link; and
in response to the first user input commanding a second-level grouping operation for the plurality of first-level stacks:
  grouping, by the user device, the plurality of first-level stacks into one or more second-level stacks, wherein each second-level stack includes one or more first-level stacks having one or more similar first-level stack attributes, and
  displaying, on the GUI, the one or more second-level stacks.

2. The method of claim 1, wherein the first user input includes at least one of a voice command, a touch gesture, or a click selection.

3. The method of claim 2, wherein the touch gesture includes receiving one or more user interactions with the graphical user interface.

4. The method of claim 2, wherein the touch gesture includes at least one of:
a pinching gesture indicative of two finger swipes moving towards each other at substantially the same time;
a swiping gesture indicative of one or more substantially simultaneous finger swipes in a common direction; or
a raised pinching gesture indicative of two finger swipes moving towards each other followed by a release of the finger swipes from the display when the two finger swipes substantially converge at a common point.

5. The method of claim 1, further comprising:
in response to the second user input commanding a zooming operation:
  determining, by the user device, a first number of displayed cards; and
  displaying, on the GUI, a second number of cards not equal to the first number of cards; and
in response to the first user input commanding a zooming operation:
  determining, by the user device, a first number of displayed first-level stacks; and
  displaying, on the GUI, a second number of first-level stacks not equal to the first number of first-level stacks.

6. The method of claim 1, wherein:
the application access mechanism attributes and the first-level stack attributes include at least one of an application identifier, an application state action, an application category, an entity name, or an entity location, and
the category type includes web, image, video, and news.

7. The method of claim 1, wherein:
the user device includes memory hardware; and
each application executable on the user device is stored on the memory hardware.

8. The method of claim 1, further comprising:
receiving a fourth user input through the GUI; and
in response to the fourth input commanding a zooming operation while the GUI is displaying one or more second-level stacks:
  determining, by the user device, a first number of displayed second-level stacks, and
  displaying, on the GUI, a second number of second-level stacks not equal to the first number of second-level stacks.

9. A user device comprising:
a display;
data processing hardware in communication with the display; and
memory hardware in communication with the data processing hardware, the memory hardware storing instructions that when executed on the data processing hardware cause the data processing hardware to perform operations comprising:
  displaying a graphical user interface (GUI) on the display;
  receiving a search query inputted via the GUI, wherein the search query includes a category type;
  determining a set of results based on the search query, wherein each result in the set of results is associated with an application installed on the user device;
  receiving cards, wherein each card is associated with:
    at least one result of the set of results,
    a collection of application access mechanisms having one or more similar application access mechanism attributes, wherein each application access mechanism (i) references an application executable on the data processing hardware and (ii) defines an application state of the referenced application, and
    a category type;
  grouping the cards into a plurality of first-level stacks, wherein:
    a first first-level stack of the plurality of first-level stacks includes a set of cards associated with the category type includes in the search query, and
    a second first-level stack of the plurality of first-level stacks includes a set of cards not associated with the category type includes in the search query;
  displaying on the GUI the plurality of first-level stacks;
  receiving a first user input through the GUI;

in response to the first user input commanding a first-level ungrouping operation for a selected first-level stack of the plurality of first-level stacks:
  ungrouping the selected first-level stack into one or more cards associated with the selected first-level stack,
  displaying, on the GUI, the one or more cards associated with the selected first-level stack, wherein each card includes (i) a user selectable link associated with the respective card and (ii) a card access mechanism having a reference to the collection of application access mechanisms represented by the respective card,
  receiving a second user input through the GUI,
  in response to the second user input commanding a selection of one of the card user selectable links, displaying on the GUI, application user selectable links, wherein each application user selectable link is associated with an application access mechanism of the collection of application access mechanisms associated with the selected card, and
  receiving a third user input through the GUI, and
  in response to the third user input commanding a selection of an application user selectable link, executing an application referenced by the application user selectable link; and
in response to the first user input commanding a second-level grouping operation for the plurality of first-level stacks:
  grouping the plurality of first-level stacks into one or more second-level stacks, wherein each second-level stack includes one or more first-level stacks having one or more similar first-level stack attributes, and
  displaying, on the GUI, the one or more second-level stacks.

10. The user device of claim 9, wherein the first user input comprises at least one of a voice command, a touch gesture, or a click selection.

11. The user device of claim 10, wherein the touch gesture includes receiving one or more user interactions with the graphical user interface.

12. The user device of claim 10, wherein the touch gesture includes at least one of:

a pinching gesture indicative of two finger swipes moving towards each other at substantially the same time;
a swiping gesture indicative of one or more substantially simultaneous finger swipes in a common direction; or
a raised pinching gesture indicative of two finger swipes moving towards each other followed by a release of the finger swipes from the display when the two finger swipes substantially converge at a common point.

13. The user device of claim 9, wherein the operations further comprise:
  in response to the second user input commanding a zooming operation:
    determining a first number of displayed cards, and
    displaying, on the GUI, a second number of cards not equal to the first number of cards; and
  in response to the first user input commanding a zooming operation:
    determining a first number of displayed first-level stacks, and
    displaying, on the GUI, a second number of first-level stacks not equal to the first number of first-level stacks.

14. The user device of claim 9, wherein:
  the application access mechanism attributes and the first-level stack attributes include at least one of an application identifier, an application state action, an application category, an entity name, or an entity location, and
  the category type includes web, image, video, and news.

15. The user device of claim 9, wherein each corresponding application is stored on the memory hardware in communication with the data processing hardware.

16. The user device of claim 9, wherein the operations further comprise:
  receiving a fourth user input through the GUI; and
  in response to the fourth input commanding a zooming operation while the GUI is displaying one or more second-level stacks:
    determining a first number of displayed second-level stacks, and
    displaying, on the GUI, a second number of second-level stacks not equal to the first number of second-level stacks.

* * * * *